(12) United States Patent
Stork genannt Wersborg

(10) Patent No.: US 12,232,645 B2
(45) Date of Patent: Feb. 25, 2025

(54) MONITORING SYSTEM FOR AN APPARATUS FOR MAKING BEVERAGES

(71) Applicant: Interproductec Consulting Gmbh & Co. KG, Munich (DE)

(72) Inventor: Ingo Stork genannt Wersborg, Munich (DE)

(73) Assignee: Interproductec Consulting GmbH & Co. KG, Munich (DE)

( * ) Notice: Subject to any disclaimer, the term of this patent is extended or adjusted under 35 U.S.C. 154(b) by 594 days.

(21) Appl. No.: 16/982,626

(22) PCT Filed: Mar. 22, 2019

(86) PCT No.: PCT/EP2019/057332
§ 371 (c)(1),
(2) Date: Sep. 21, 2020

(87) PCT Pub. No.: WO2019/180252
PCT Pub. Date: Sep. 26, 2019

(65) Prior Publication Data
US 2021/0022547 A1    Jan. 28, 2021

(30) Foreign Application Priority Data

Mar. 23, 2018 (EP) .................................... 18163795
Mar. 28, 2018 (EP) .................................... 18164791

(51) Int. Cl.
*A47J 31/52* (2006.01)
*A47J 31/44* (2006.01)

(52) U.S. Cl.
CPC ......... *A47J 31/525* (2018.08); *A47J 31/4403* (2013.01); *A47J 31/4496* (2013.01); *A47J 31/52* (2013.01)

(58) Field of Classification Search
CPC ...... A47J 31/002; A47J 31/42; A47J 31/4403; A47J 31/4425; A47J 31/4496; A47J 31/525; A47J 31/52; A47J 31/521
See application file for complete search history.

(56) References Cited

U.S. PATENT DOCUMENTS 7,950,424 B2    5/2011   Ozanne
2017/0135519 A1    5/2017   Deng et al.
(Continued)

FOREIGN PATENT DOCUMENTS

AU    2017201612 A1    9/2017
DE    102011075194 A1    11/2012
(Continued)

OTHER PUBLICATIONS

International Search Report and Written Opinion for PCT/EP2019/057332 mailed May 27, 2019 (12 pages).

*Primary Examiner* — Reginald Alexander
(74) *Attorney, Agent, or Firm* — Brooks Kushman P.C.

(57) ABSTRACT

A monitoring system for an apparatus for making beverages is provided, comprising a sensor unit having at least one sensor to determine current sensor data of a beverage production environment, a processing unit to determine current feature data from the current sensor data and a monitoring unit adapted to determine a current beverage production state by comparing the current feature data with reference feature data of a reference beverage production process. A control unit is adapted for controlling actuators in dependence of a current beverage production state determined by the monitoring unit.

17 Claims, 7 Drawing Sheets

(56) References Cited

U.S. PATENT DOCUMENTS

2017/0262729 A1\* 9/2017 Penna .................. A47J 31/521
2020/0405088 A1\* 12/2020 Takahashi ............... A47J 31/02
2022/0202232 A1\* 6/2022 Hernou .................. A47J 31/60

FOREIGN PATENT DOCUMENTS

| DE | 10 2014 102490 A1 | 8/2015 |
| DE | 10 2014 211403 A1 | 12/2015 |
| EP | 1531708 B1 | 8/2006 |

\* cited by examiner

MONITORING SYSTEM FOR AN APPARATUS FOR MAKING BEVERAGES

CROSS-REFERENCE TO RELATED APPLICATIONS

This application is a national stage of, and claims priority to, Patent Cooperation Treaty Application No. PCT/EP2019/057332, filed on Mar. 22, 2019, which application claims priority to European Union Application No. EP 18163795.0, filed on Mar. 23, 2018, and European Union Application No. EP 18164791.8, filed on Mar. 28, 2018, which applications are hereby incorporated herein by reference in their entireties.

BACKGROUND

Treating food with heat has been done by mankind probably since the invention of fire. However, up until now this task is still controlled by a human operator. The goal of improve usability and reliability of the beverage making process.

U.S. Pat. No. 7,950,424B2 describes the filling of a receptacle with liquid by a drink vending machine with the support of visual markings. DE102011075194A1 describes the measurement of several points of a cup to control the filling. EP1531708B1 describes the measurement of the height of a cup with a preconfigured dispense amount. AU2017201612A1 describes milk foam image taking.

SUMMARY OF THE DRAWINGS

The accompanying drawings, which are included to provide a further understanding of the subject matter disclosed herein and are incorporated in and constitute a part of this application, illustrate embodiment(s) and together with the description serve to explain the principle of the invention. In the drawings.

DESCRIPTION

Figure 1:
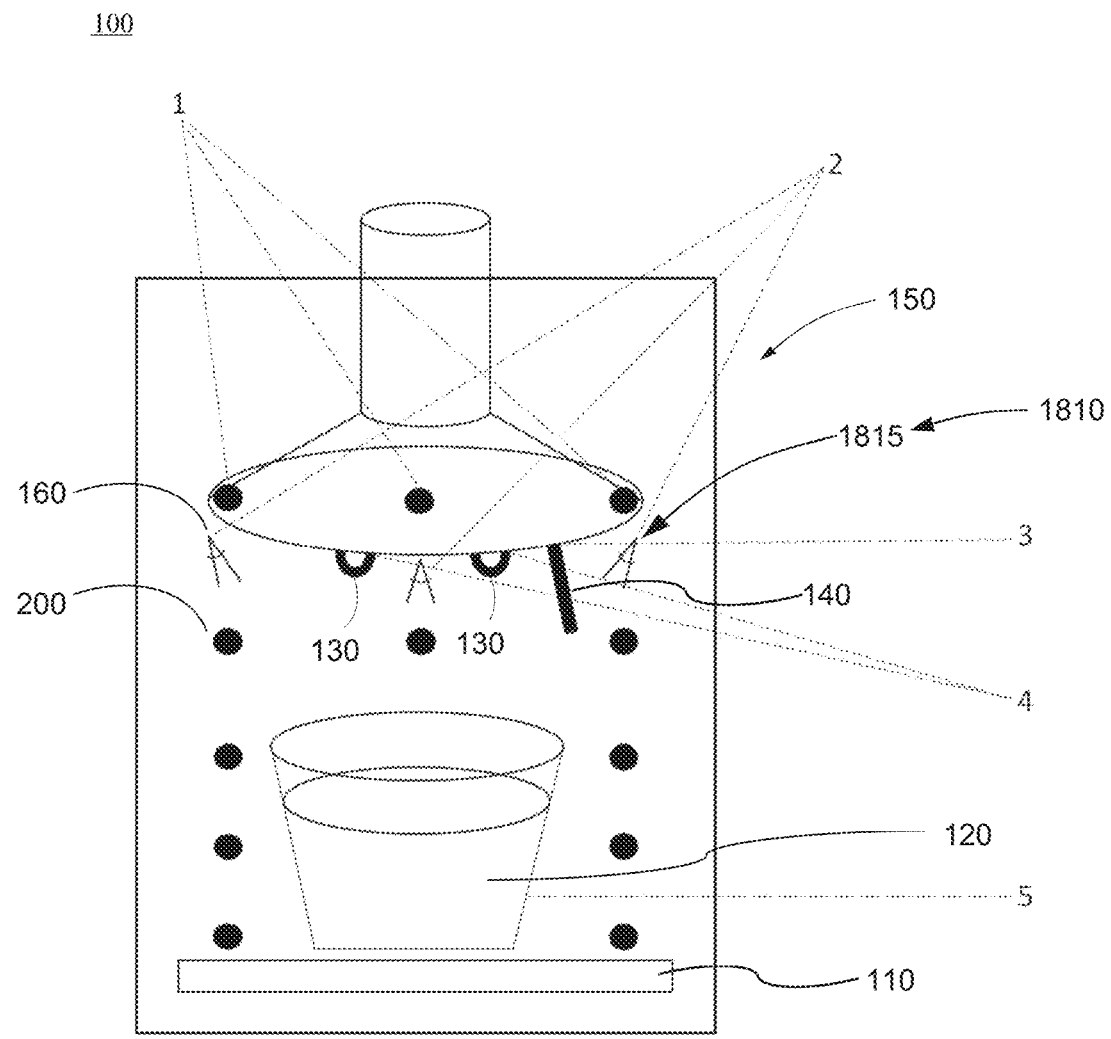
FIG. 1 shows a monitoring system for a coffee maker.

The present disclosure concerns a monitoring system for an apparatus for making beverages, to an apparatus for making beverages comprising the monitoring system, and to a monitoring method for making beverages, in particular coffee or tea.

With reference to the various figures, a monitoring system 150 for an apparatus 100 for making beverages according to an embodiment may comprise a sensor unit 1810 having at least one sensor 1815 to determine current sensor data of a beverage production environment; a processing unit 1820 to determine current feature data from the current sensor data; and a monitoring unit 1830 adapted to determine a current beverage production state by comparing the current feature data with reference feature data of a reference beverage production process, and a control unit 1860 for controlling actuators in dependence of a current beverage production state determined by the monitoring unit 1830. The system 150 may further comprise a learning unit 1840 being adapted to determine reference feature data of a reference beverage production process by combining predetermined feature data of a beverage production program with a training set of feature data of at least one training beverage production process being classified as being part of the training set by an user preference. The system 150 may further comprise a recording unit 1822 to record current feature data of a current beverage production process, wherein the learning unit 1840 is adapted to receive the recorded feature data from the recording unit 1822 to be used as feature data of a training beverage production process. The learning unit 1840 may be adapted to determine a mapping of current sensor data to current feature data and/or to determine reference feature data of a reference beverage production process based on feature data of at least one training beverage production process. The system 150 may further comprise a classification unit 1850 adapted to classify the type of beverage container to be filled and to choose a reference beverage production process corresponding to the determined type of beverage container. The sensor unit 1810 may comprise a camera 160 recording a pixel image of a cup placement area or treatment area 110, wherein the current sensor data of the camera 160 corresponds to the current pixel data of a current pixel image. The monitoring unit 1830 may be adapted to identify an empty cup holding area by classifying current feature data, and the control unit 1860 may be adapted to prevent a beverage dispensing process in case an empty cup holding area is identified by the monitoring unit 1830. The monitoring unit 1830 may be adapted to identify the size and/or type of a beverage container 120 being placed in a treatment area 110 by classifying current feature data, and the control unit 1860 may be adapted to preselect at least one beverage making program in dependence of the cup size and/or cup type identified by the monitoring unit 1830. The monitoring unit 1830 may be adapted to identify a filling state of a beverage container 120 being placed in a treatment area 110 by classifying current feature data, and the control unit 1860 may be adapted to start or to stop dispensing a beverage in dependence of the filling state identified by the monitoring unit 1830. The monitoring unit 1830 may be adapted to identify a desired coffee foaming level by repeatedly identifying the filling state, and the control unit 1860 may be adapted to stop a milk dispensing or foaming process as the desired milk foam or beverage container filling is reached. The monitoring unit 1830 may be adapted to identify the rising speed of milk foam by repeatedly identifying the filling state, and the control unit 1860 may be adapted to increase or decrease the pressure of a milk foamer in order to expedite or slow down the desired foaming process. The monitoring unit 1830 may be adapted to identify the colour of a top surface of a beverage in a beverage container 120 in a treatment area 110 by classifying current feature data, and the control unit 1860 may be adapted to adapt the beverage making process in dependence of the beverage colour identified by the monitoring unit 1830. The monitoring unit 1830 may be adapted to identify crema present on top of the beverage in the beverage container 120 in the treatment area 110 by identifying the colour of the top surface of the beverage in the beverage container 120 in the treatment area 110, and the control unit 1860 may be adapted to increase degree of grinding of the coffee beans in case crema is not present on top of the beverage. The monitoring unit 1830 may be adapted to identify a desired coffee extraction level by identifying the colour of the top surface of the beverage in the beverage container 120 in the treatment area 110, and the control unit 1860 may be adapted to stop the dispensing process as the desired extraction level is reached. The monitoring unit 1830 may be adapted to identify certain data profiles for different coffee beans processed by classifying current feature data, and the control unit 1860 may be adapted to output information that unknown or unsuitable coffee beans are used. An apparatus 100 for making beverages may comprise a beverage machine for making beverages; and the monitoring system 150.

A monitoring system 150 for an apparatus 100 for making beverages according to an embodiment may comprise a sensor unit 1810 having at least one sensor 1815 to determine current sensor data of the beverage being produced; a processing unit 1820 to determine current feature data from the current sensor data; and a monitoring unit 1830 adapted to determine a current beverage production state by comparing the current feature data with reference feature data of a reference beverage production process. The system may further comprise a learning unit 1840 adapted to determine a mapping of current sensor data to current feature data and/or to determine reference feature data of a reference beverage production process or reference heating process based on feature data of at least one training beverage production process or at least one training heating process. The learning unit 1840 may be adapted to determine a mapping of current sensor data to current feature data by means of a variance analysis of at least one training beverage production process to reduce the dimensionality of the current sensor data. The learning unit 1840 may be adapted to determine a mapping of current feature data to feature data by means of a variance analysis of at least one training beverage production process to reduce the dimensionality of the current feature data. The variance analysis may comprise at least one of principal component analysis PCA, isometric feature mapping ISOMAP or linear Discriminant analysis LDA or a dimensionality reduction technique or an artificial neural network. The learning unit 1840 may be adapted to determine reference feature data of a reference beverage production process or a reference heating or food processing process by combining predetermined feature data of a beverage production program or a heating program with a training set of feature data of at least one training beverage production process being classified as being part of the training set by an user preference. The system 150 may further comprise a recording unit 1822 to record current feature data of a current beverage production process or a current heating process or a current food processing, wherein the learning unit 1840 is adapted to receive the recorded feature data from the recording unit 1822 to be used as feature data of a training beverage production process. The sensor unit 1810 may comprises a camera 160 recording a pixel image of a beverage container being filled or of food being heated or being processed, wherein the current sensor data of the camera corresponds to the current pixel data of a current pixel image. The current pixel data may comprise first pixel data corresponding to a first color, second pixel data corresponding to a second color, and third pixel data corresponding to a third color. The first, second and third color corresponds to R, G and B, respectively. The camera 160 may be adapted to generate HDR processed pixel images as current pixel data. The system 150 may further comprise a classification unit 1850 adapted to classify the type of beverage container to be filled and to choose a reference beverage production process o reference heating or processing process corresponding to the determined type of beverage container. An apparatus 100 for making beverages may comprise a beverage machine for making beverages or hot or cold beverages; and the monitoring system 150.

A monitoring system 150 for an apparatus 100 for making beverages according to an embodiment may comprise a sensor unit 1810 having at least one sensor 1815 to determine current sensor data of the beverage being produced; a processing unit 1820 to determine current feature data from the current sensor data; and a monitoring unit 1830 adapted to determine a current beverage production state by comparing the current feature data with reference feature data of a reference beverage production process, and a control unit 1860 for controlling actuators in dependence of a current beverage production state determined by the monitoring unit 1830. The system 150 may further comprise a learning unit 1840 being adapted to determine reference feature data of a reference beverage production process by combining predetermined feature data of a beverage production program with a training set of feature data of at least one training beverage production process being classified as being part of the training set by an user preference. The system 150 may further comprise a recording unit 1822 to record current feature data of a current beverage production process, wherein the learning unit 1840 is adapted to receive the recorded feature data from the recording unit 1822 to be used as feature data of a training beverage production process. The learning unit 1840 may be adapted to determine a mapping of current sensor data to current feature data and/or to determine reference feature data of a reference beverage production process based on feature data of at least one training beverage production process. The system 150 may further comprise a classification unit 1850 adapted to classify the type of beverage container to be filled and to choose a reference beverage production process corresponding to the determined type of beverage container. The sensor unit 1810 may comprise a camera 160 recording a pixel image of a cup placement area or treatment area 110, wherein the current sensor data of the camera 160 corresponds to the current pixel data of a current pixel image. The monitoring unit 1830 may be adapted to identify an empty cup holding area by classifying a current pixel image of the treatment area 110 recorded by the camera 160, and the control unit 1860 may be adapted to prevent a coffee dispensing process in case an empty cup holding area may be identified by the monitoring unit 1830. The monitoring unit 1830 may be adapted to identify the event of a small or medium or large cup being placed in the treatment area 110, to count the number of identified objects in the treatment area, and to identify two small cups in the treatment area 110 by classifying a current pixel image of the treatment area 110 recorded by the camera 160, and the control unit 1860 may be adapted to preselect a two beverage container program in case two small cups in the treatment area 110 are identified by the monitoring unit 1830. The monitoring unit 1830 may be adapted to identify the event of different cup fillings in the treatment area 110 by classifying a current pixel image of the treatment area 110 recorded by the camera 160, and the control unit 1860 may be adapted to stop dispensing coffee or milk foam in case a predetermined cup filling is identified by the monitoring unit 1830. The monitoring unit 1830 may be adapted to identify the event of crema present on top of an espresso in the treatment area 110 by classifying a current pixel image of the treatment area 110 recorded by the camera 160, and the control unit 1860 may be adapted to increase degree of grinding of the coffee beans in case crema is not present on top of the espresso. The monitoring unit 1830 may be adapted to identify a desired coffee extraction level by classifying a current pixel image of the treatment area 110 recorded by the camera 160 as features of certain colours, and the control unit 1860 may be adapted to stop the dispensing process as the desired extraction level is reached. The monitoring unit 1830 may be adapted to identify certain data profiles for different coffee beans processed by classifying a current pixel image of the treatment area 110 recorded by the camera 160, and the control unit 1860 may be adapted to output information that unknown or unsuitable coffee beans are used. The monitoring unit 1830 may be adapted to identify a desired coffee foaming level by classifying a current pixel image of the treatment area 110 recorded by the camera 160 as features of certain volumes, and the control unit 1860 may be adapted to stop a milk dispensing or foaming process as the desired milk foam or cup filling is reached. The monitoring unit 1830 may be adapted to identify the rising speed of the milk foam by classifying a current pixel image of the treatment area 110 recorded by the camera 160 as features of certain volumes, and the control unit 1860 may be adapted to is increase or decrease the pressure of the milk foamer in order to expedite or slow down the desired foaming process. An apparatus 100 for making beverages may comprise a beverage machine for making beverages or hot or cold beverages; and the monitoring system 150.

Turning now to FIG. 1, a monitoring system 150 for an apparatus for making beverages 100 is shown. The dark points indicate illumination devices 200, which can be positioned at respective positions indicated by reference sign 1. In FIG. 1, the apparatus for making beverages 100 constituting a coffee maker is shown from a front side. On a base 110, a beverage container 120 indicated by reference number 5 is positioned in front of the apparatus 100, to be filled with a beverage such as coffee through at least one beverage supply tube 130, such as coffee nozzles indicated by No. 4. Furthermore, a milk supply tube 140 may be provided at a front side of the apparatus 100, to provide hot milk or even foamed milk to the beverage container 120, to make, for example, Cappuccino or Latte Macchiato.

The monitoring system or monitoring apparatus 150 comprises a sensor unit 1810 having at least one sensor 1815 to determine current sensor data of the beverage being produced and filled into the beverage container 120. The sensor unit 1810 or the sensor 1815 may be positioned next to one of the at least one beverage supply tube 130 or milk supply tube 140. The sensor unit 1810 or the sensor 1815 may be fixed to a front side of the apparatus 100 to be located above the beverage container 120 when being filled with a beverage. The sensor unit 1810 of the monitoring system 150 may comprise an optical sensor 160. The optical sensor 160 may be a camera. The field of view of the optical sensor or camera 160 may be directed to an upper side of the base 110 or to the upper side and to the inside of the beverage container 120, to observe the beverage when being filled into the beverage container 120. Different possible positions of the camera 160 are indicated by the reference number 3.

Figure 2:
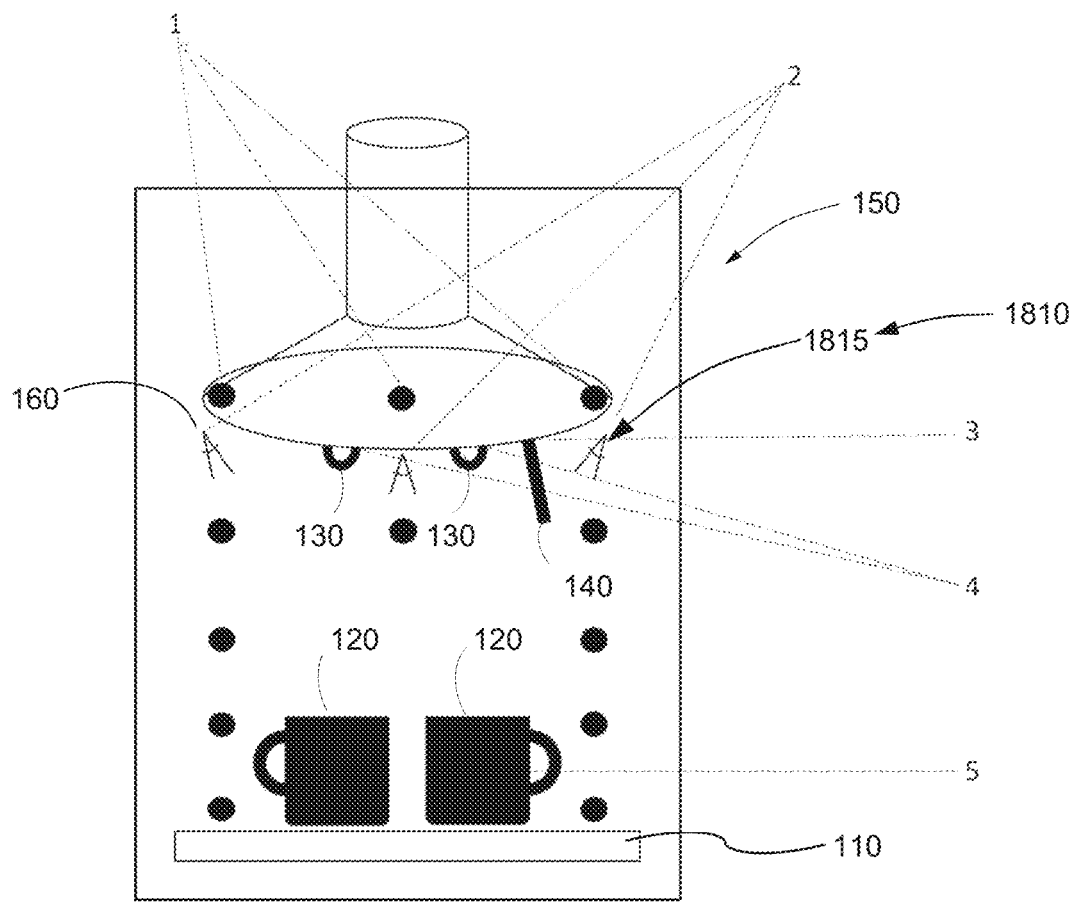
FIG. 2 shows a monitoring system for a coffee maker.

In FIG. 2, two small beverage container 120 such as espresso cups are positioned under two beverage supply tubes or nozzles 130 to be filled with beverage, respectively. The further features shown in FIG. 2 are the same as shown in FIG. 1.

Figure 3:
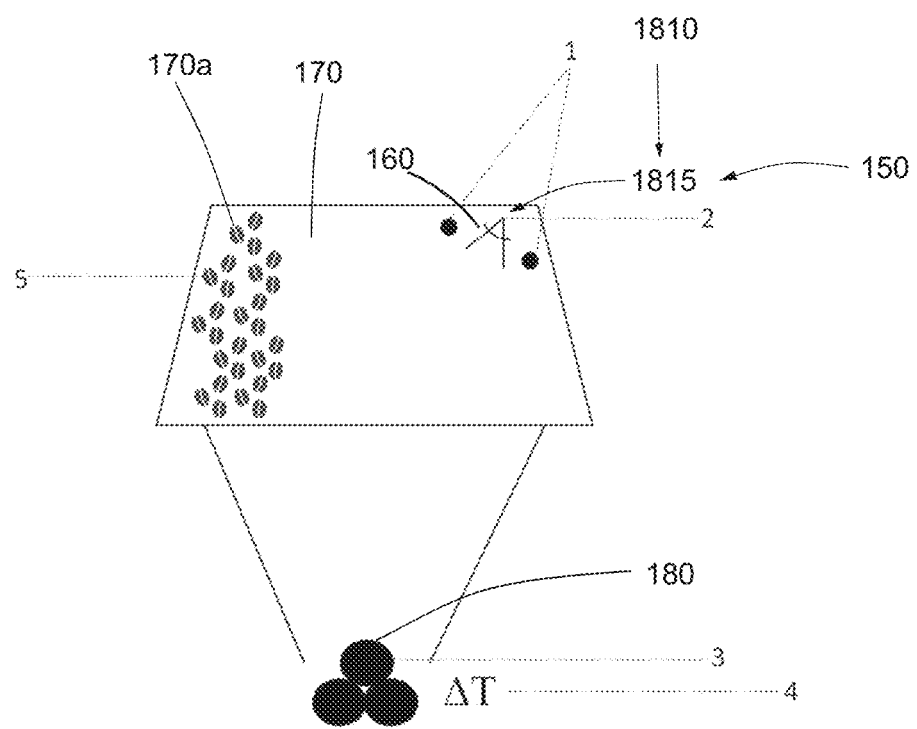
FIG. 3 shows a monitoring system for a coffee grinder.

FIG. 3 shows another embodiment of a monitoring system 150 for an apparatus for making beverages 100. As can be seen from FIG. 3, the sensor 1815 indicated by No. 2 may be positioned within a bean container of the apparatus 100 containing beans indicated by No. 5. No. 1 demonstrates different illumination positions of illumination devices also positioned in the coffee bean container 170 of the apparatus 100 to illuminate the coffee beans 170a in the coffee beans container 170. The sensor 1815 may be an optical sensor 160 or camera. No 3 shows a coffee grinder unit 180. The grinder unit may be controlled by a control unit 1860, to be operated for a predetermined grinding time T, as indicated by No. 4, which demonstrates the grinding properties such as grinding times.

In the following, different embodiments of procedures shall be described.

As shown in FIGS. 1 to 3, a procedure to use a monitoring system 150 comprises at least one sensor 1815 or multiple sensors such as a camera, and/or timers, and/or thermometers. The monitoring apparatus 150 is attached same to an apparatus for making beverages or beverage processing apparatus 100 such as a coffee maker. In addition, a specific illumination device 200 is provided to illuminate the dispensing or beverage container or cup holding area. Current sensor data or feature data of at least one sensor 1815 is gathered during using the apparatus 100 such as brewing coffee, foaming milk, refilling coffee beans, grinding coffee beans, emptying the waste bin, filling liquids, cleaning or other service procedures. Then, the gathered data is labelled towards a certain event such as coffee extraction level or desired coffee product result. Machine learning techniques are then applied such as training a classifier to detect a certain event. Then when a certain event happens again, the monitoring system 150 shall signal this event and initiate an action such as visual or acoustic feedback or adaption of control parameters of a coffee maker. It is important to note that feature data can be gathered from different data sources including different sensor types. Different types and variations of this procedure comprising different steps are described in the following.

Often the heat treatment of food in particular for coffee making with a coffee maker follows manual setup and happens under human supervision. When a human operator puts a cup under a coffee maker, important properties such as temperatures, times such as brewing and grinding, steam, pressures, water and milk quantities have to be set. Usually the settings are stored within a database of coffee maker control programs. A human operator has to pick the appropriate program and this still is source of error and creates human labour with a certain degree of know how. Further, many process parameters may lead to an undesired food product outcome. Coffee may be under or over-extracted, even if the correct program has been chosen. This may be caused by differences in kind and age of beans, grinding result, water and milk properties and many more. It still requires skilled human labor such as a barista or coffee maker application specialist to calibrate or to supervise coffee making or the food heat treatment.

The present disclosure implements the heat treatment of food that no further human interaction is necessary besides placing a cup with the coffee maker or the heat treatment machine. Even this step could be included, if desired. In order to do so the apparatus 100 needs a treatment chamber or heat treatment area that is camera monitored. Instead of using, as a sensor 1815, a camera, an array of at least two photodiodes may also be used. It is advantageous to use more sensors 1815 acquiring signals related to the coffee making process such as grinder run time T and intensity, weight of coffee beans or ground coffee, vibration sensor, optical sensors including sensor gathering spectral distribution, throughput of steam, water, milk, time, ventilation, heat distribution, load volume, load distribution, load weight, temperature of food surface, and interior temperature of the treated food. The following sensors 1815 may as well be applied: hygrometer, laser triangulation, insertion temperature sensor, acoustic sensors, solid-borne acoustic sensor, scales, timer, and many more. It is advantageous to apply cooling systems attached to any heat sensible sensor applied. For instance, this could be an electrical, air or water cooling system such as a Peltier cooler or thermoelectric heat pump or vapor-compression refrigeration, and many more.

The treatment area or the cup holder or the base 110 is monitored with at least one camera 160 or image sensor or photodiode array with at least two photodiodes. It is advantageous to use more than one camera in order to monitor several points of views. The camera 160 may position near the coffee nozzle 140 but it is advantageous to apply a window that reduces the heat influence towards the camera 160. The window may be on any side of the coffee nozzle 140. The window may be heated, coated or ventilated in order to prevent fogginess or greasing. It is advantageous to apply illumination to the treatment area or cup placement area by integrating at least one bulb or light-emitting diode (LED). Certain LED diodes may emit light of a specific wavelength including from IR or UV bandwidth. Defined treatment area or cup holding illumination supports taking robust camera images.

It is further advantageous to apply illumination for at least one specific wavelength and to apply an appropriate wavelength filter for the camera or image sensor or photodiode array. The wavelength range of the filter may be 5 nm, or 10 nm, or 20 nm, or 50 nm. This further increases the robustness of the visual monitoring system. If the wavelength is chosen to be infrared or near-infrared and the image sensor and optional filters are chosen accordingly, the visual monitoring system may gather information related with temperature distribution that may be critical for certain food treatment processes. The camera or visual system 160 may be equipped with a specific lens system that is optimizing the food or coffee or coffee cup or coffee maker visualization. Further it may be equipped with an autofocus system and brightness optimization techniques. It is advantageous to use several image sensors for specific wavelengths in order to gather information about change in color related to the food treatment. It is advantageous to use several sensor in a 3D camera setup or a time-of-flight camera to acquire distance or depth information. It is advantageous to combine a camera with a photodiode sensitive for infrared wavelength or other non-contact temperature sensor to combine images with temperature information and add them to the feature data space. It is advantageous to use a point of view of a camera so barcodes or QR codes of for instance coffee bean bags can be read. It is advantageous to position the camera or image sensors to gather information of volume change of the food or beverage during heat treatment. It may be in particular advantageous to setup a top-view of the food products or coffee cup or coffee bean tray.

The treatment chamber or cup holding area is further equipped with at least one temperature sensor or thermometer. When treating food with heat temperature information relates to process characteristics. It may contain information towards heat development over time. It may also gather information about the state of the apparatus or coffee maker 100, its heating system and optional pre-heating. It is advantageous to integrate insertion thermometers. Insertion thermometers enable to gather, as current sensor data, inside food or liquid temperature information that is critical to determine the food processing state. It is advantageous to measure, as current sensor data, the pH level of the water used to brew coffee as different pH levels result into different coffee extraction levels or tastes. It is further advantageous to add the pH level information to the feature data space, which then can in combination with other feature data such as spectral or colour information of the dispensed coffee can lead to an adaption of the grinding or brewing parameters in order to recreate certain flavour profiles. By integrating scales in the tray or coffee holding system or the coffee bean and ground coffee container further feature data can be gathered. It is advantageous to acquire, as current sensor data, the weight information for every used tray or set of trays or container individually in order to have information related about the total food, coffee bean, ground coffee, milk, water or beverage weight and its relative distribution as the desired energy supply and its direction during the heat treatment may vary significantly. Further it is advantageous to acquire information of the food weight differences over time while treating it with heat. Further, it is possible to acquire, as current sensor data, information regarding the state of food by emission and capturing of sound signals.

While processes are in particular described for food items such as coffee, milk, coffee beans and water, the methods, techniques and procedures can also be applied to other liquids and beverage machines and processing steps. This includes dispensing, mixing, in-cup mixing, crushed ice and ice cube additions, detection of transport shuttles, opening doors, filtered coffee and coffee processing with steam, cold brew coffee techniques, addition of nitrogen to a liquid, processing of soups and mashed or mixed food items such as milkshakes, shakes of water and flavour, addition of flavour syrups or sugars or sugar substitutes.

Preparing or dispensing hot or cold beverages with an apparatus such as a coffee maker or heat treatment machine 100 can be a complex process, which requires certain capabilities by a machine to identify certain events and initiate certain actions. A number of tasks are still performed by human operators that can also be handled by a machine, if it could "see" or "hear" in other words if it could identify certain events from visual or acoustic data. By integrating an optical or acoustic sensor such as a camera 160 to a coffee maker 100 and eventually adding more data sources from sensors 1815 integrated in the coffee maker 100 or gathered from connected devices, a feature data space can be gathered based on current sensor data. Different learning tasks and processing steps require different sensor and measurement techniques. It may be advantageous to add near and mid-infrared spectral analyses, spectra-structure correlation, Fourier transform infrared measurement or Fourier transform infrared spectroscopy techniques to complement the feature data space. Induction of radio frequency radiation and measurement of the signal reflection to gather data, detect or classify coffee, coffee beans, coffee grind, compositions of ingredients, milk and milk foam properties can be used to add to the feature data space. With techniques known as machine learning such as deep learning and artificial neural networks also described later in this document, a certain capability or learning task can be achieved and stored in trained software agents or data models. It is important to note that the features used from the feature data space result from the agent training and are represented in the data models. The selected features may not have been chosen or foreseen by the system designer. The following is a list of procedures that can be trained with such as sensor setup and the application of machine learning techniques:

A camera 160 is monitoring an illuminated cup holding area of a coffee maker 100.

Step A: Pictures or images or image frames are gathered of an empty cup holding area to generate current sensor data.

Step B: Labels or feature space foot prints are provided of empty cup holding area pictures.

Step C: A classifier is trained by the labels of empty cup holding area pictures to identify the event of an empty cup holding area.

Step D: The monitoring system 150 is adapted to identify an empty cup holding area by classifying current sensor data being pictures or images or image frames of the cup holding area.

Step E: The control unit 1860 of the apparatus 100 or coffee maker is signalled not to dispense coffee.

In particular, in step A, pictures or images or image frames are gathered of an empty cup holding area or a treatment area 110 without a beverage container 120 to generate current sensor data. In step B, labels or feature space foot prints are provided of empty cup holding area pictures to be used as a training set of feature data. In step C, a classifier of the monitoring unit 1830 is trained by the training set of feature data being the labels of empty cup holding area pictures to identify the event of an empty cup holding area. In step D, the monitoring unit 1830 is adapted to identify an empty cup holding area 110 by classifying current feature data being calculated from a processing unit 1820 from current sensor data being pictures or images or image frames of the cup holding area. In step E, the control unit 1860 of the apparatus 100 or coffee maker is signalled not to dispense coffee.

Step A: Pictures or images or image frames are gathered of different cups.

Step B: Pictures are label for different cups such as small, medium, large.

Step C: A classifier is trained to identify the event of a small or medium or large cup being placed in the observation area.

Step D: A software logic is programmed to count the number of identified objects in the observation area.

Step E: The monitoring system 150 is adapted to identify two small cups in the observation area.

Step F: The control unit 1860 of the apparatus 100 or coffee maker is signalled to preselect a two beverage container program.

In particular, in step A, pictures or images or image frames are gathered of different cups to generate current sensor data. In step B, pictures are labelled for different cups such as small, medium, large, to be used as a training set of feature data. In step C, a classifier of the monitoring unit 1830 is trained to identify the size of the beverage container being a small or medium or large cup being placed in the observation area or treatment area 110. In step D, a software logic of the monitoring system 150 is programmed to count the number of identified objects in the treatment area 110. In step E, the monitoring system 150 is adapted to identify two small cups in the treatment area 110. In step F, the control unit 1860 of the apparatus 100 or coffee maker is signalled to preselect a two beverage container program.

Step A: Pictures are gathered of different cup fillings.

Step B: Pictures are label for different cups fillings such as empty, 20%, 40%, 60%, 80% and 100% full.

Step C: A classifier is trained to identify the event of different cup fillings in the observation area.

Step D: The monitoring system identifies a cup filling of 80% in the observation area.

Step E: The control unit of the coffee maker is signalled to stop dispensing coffee or milk foam.

In particular, in step A, Pictures are gathered of different cup fillings to generate current sensor data. In step B, pictures are labelled for different cup fillings such as empty, 20%, 40%, 60%, 80% and 100% full, to be used as a training set of feature data. In step C, a classifier of the monitoring unit 1830 is trained to identify the event of different cup fillings in the treatment area 110. In step D, the monitoring system 150 identifies a cup filling of 80% in the treatment area 110. In step E, the control unit 1860 of the beverage maker or coffee maker is signalled by the monitoring unit 1830 to stop dispensing coffee or milk foam.

Step A: Pictures are gathered of different coffee brewing with and without crema, light coloured foam on top of the dark coffee liquid.

Step B: Pictures are label for different coffee brewing with and without crema.

Step C: A classifier is trained to identify the event of crema present on top of an espresso in the observation area.

Step D: The monitoring system identifies that crema is not present on top of the espresso.

Step E: The control unit of the coffee maker is signalled to increase degree of grinding of the coffee beans.

In particular, in step A, pictures are gathered of different coffee brewing with and without crema, light coloured foam on top of the dark coffee liquid to generate current sensor data. In step B, pictures are labelled for different coffee brewing with and without crema, to be used as a training set of feature data. In step C, a classifier of the monitoring unit 1830 is trained to identify the event of crema present on top of an espresso in the treatment area 110. In step D, the monitoring system 150 identifies that crema is not present on top of the espresso. In step E, the control unit 1860 of the beverage maker or coffee maker is signalled by the monitoring unit 1830 to increase degree of grinding of the coffee beans.

The dispensing behaviour is also an important feature data source, as the timing and colour change as well as flow behaviour and shapes created by the dispensed coffee may be used as differentiating quality metrics. With a visual monitoring system of the dispensing area, the coffee generation process can be optimized. Grinding times, temperature curves, steam level, dispensing times, liquid amounts can be adapted in order to achieve a certain quality metric.

Step A: A sequence of pictures are gathered of different coffee brewing with different timings of colours, such as dark brown to light brown.

Step B: Pictures are label for the desired coffee extraction level.

Step C: A classifier is trained to identify the desired coffee extraction level.

Step D: The monitoring system 150 identifies the desired coffee level as features of certain colours are recognized.

Step E: The control unit of the coffee maker is stopping the dispensing process as the desired extraction level is reached.

In particular, in step A, a sequence of pictures are gathered of different coffee brewing with different timings or colours, such as dark brown to light brown, to generate current sensor data. In step B, pictures are labelled according to the respective desired coffee extraction level, to be used as a training set of feature data. In step C, a classifier of the monitoring unit 1830 is trained to identify the desired coffee extraction level. In step D, the monitoring system 150 identifies the desired coffee extraction level as features of certain colours are recognized. In step E, the control unit 1860 of the coffee maker is stopping the dispensing process as the desired extraction level is reached.

If the feature data space contains differentiating information for of the type, composition or authenticity of coffee beans or coffee grind, machine learning techniques can be used to train software agents or create data models to identify the coffee type or composition. For a certain degree of differentiation spectral information gathered from a camera may be sufficient. The influence of environment light can be minimized with creating a defined illumination of the cup holding area of one or multiple light sources. A sequence of colours and shapes can be projected to the cup holding area in order to gather data for the feature space. In addition near and mid-infrared wavelength light can be projected into the cup or onto the coffee beans or grind or just the reflection measured of specific wavelength can be gathered and added to the feature data space. Certain wavelengths are in particular advantageous for differentiating such as identifying arabica and robusta coffee compositions within the range of 1100-2500 nm (nanometers), identifying arabica and robusta coffee compositions within 400-2498 nm, prediction of roasting degree within 830-2500 nm and others for authentication of Kona coffee or Caffeine content.

Step A: Pictures are gathered of different coffee brewings with different kind of coffee beans. Spectral information such as from near and mid-infrared or visible wavelengths and visual data is gathered at coffee bean tray or from the coffee dispensed in the cup. Grinding times and run times are gathered and added to a feature data space consisting of data vectors.

Step B: The data vectors are label for different coffee bean types.

Step C: A classifier is trained to identify the event certain data profiles for different coffee beans processed.

Step D: The monitoring system identifies that a certain coffee bean is used.

Step E: The control unit of the coffee maker is signalled to inform that unknown or unsuitable coffee beans are used.

In particular, in step A, pictures are gathered of different coffee brewings with different kind of coffee beans to generate current sensor data. Spectral information such as from near and mid-infrared or visible wavelengths and visual data is gathered at coffee bean tray or from the coffee dispensed in the cup. Grinding times and run times are gathered and added to a feature data space consisting of data vectors. In step B, the data vectors are labelled for different coffee bean types, to be used as a training set of feature data. In step C, a classifier of the monitoring unit 1830 is trained to identify the event certain data profiles for different coffee beans processed. In step D, the monitoring unit 1830 identifies that a certain coffee bean is used. In step E, the control unit 1860 is signalled by the monitoring unit 1830 to inform that unknown or unsuitable coffee beans are used.

It is advantageous to differentiate coffee bean bags or ingredient containers using sensors applied to the coffee maker or liquid processing apparatus or food processing machine to read a barcode or Quick Response codes or colour code or symbol or any other form of visual differentiator of a coffee bean bag or ingredient container and to add the differentiator information to the feature data space. It is further advantageous to store the differentiator information together with date and location of processing within a database. This database could be stored on an online server. It is further advantageous to store each transaction or processing in time or location along the supply chain. Storing and accessing the transaction or processing information could be managed in a blockchain format within a connected network of nodes. Thus, the actual traceability information is not stored in a single server but in several nodes of a network, also allowing for certain data security. This can allow for traceability if the right coffee bean is used for the settings stored in a coffee maker but also allow for a traceability back to the roasting or origin or harvest of coffee beans, which then could again be part of a feature data space.

Milk and its handling is one of the most complex challenges in creating coffee drinks known as cappuccino, latte macchiato, espresso macchiato, flat white and many more. Often it is desired to create a certain volume of microfoam and a designated milk temperature of around 60 to 70 degree Celsius. However, differences in pasteurization of milk or level of heat pre-processing of milk, free fatty acids compositions, storage time, fat content, number or re-heating, over heating may have significant and unforeseen influence on the milk foaming behaviour and flavour characteristic. Measuring and observing temperatures and temperature gradients, foam volume development and dispensing behaviour can be done and be captured with visual data that is added to the feature space. If a desired result such as a desired cappuccino process behaviour and end look is provided as feedback to the gathered data, preferred process results can be detected and processing parameters can be adapted in order to achieve a desired process result. This can also be extended to achieve a desired foam coffee pattern or latte art.

Step A: A sequence of pictures are gathered of different foaming and milk dispensing processes with different foam volumes and visual differences, including too low amounts of foam and overflowing of the container.

Step B: Pictures are label for the desired foaming level.

Step C: A classifier is trained to identify the desired coffee foaming level.

Step D: The monitoring system identifies the desired foaming level as features of certain volumes are recognized.

Step E: The control unit of the coffee maker is stopping the milk dispensing or foaming process as the desired milk foam or cup filling or visual impression is reached.

In particular, in step A, a sequence of pictures are gathered of different foaming and milk dispensing processes with different foam volumes and visual differences, including too low amounts of foam and overflowing of the container to generate current sensor data. In step B, pictures are labelled for the desired foaming level. In step C, a classifier of the monitoring unit 1830 is trained to identify the desired coffee foaming level. In step D, the monitoring unit 1830 is adapted to identify the desired foaming level as features of certain volumes are recognized. In step E, the control unit 1860 of the coffee maker is stopping the milk dispensing or foaming process as the desired milk foam or cup filling or visual impression is reached.

Step A: A sequence of pictures and temperature curves are gathered of different foaming and milk dispensing processes with different foam volumes and visual differences, including too low amounts of foam and overflowing of the container.

Step B: Pictures are label for the desired foam rising.

Step C: A classifier is trained to identify the rising speed of the milk foam.

Step D: The monitoring system identifies the desired foaming rising as features of certain volumes are recognized.

Step E: The control unit of the coffee maker is increasing or decreasing the pressure of the milk foamer in order to expedite or slow down the desired foaming process.

In particular, in step A, a sequence of pictures and temperature curves are gathered of different foaming and milk dispensing processes with different foam volumes and visual differences, including too low amounts of foam and overflowing of the container, to generate current sensor data. In step B, pictures are labelled for the desired foam rising. In step C, a classifier of the monitoring unit 1830 is trained to identify the rising speed of the milk foam. In step D, the monitoring unit 1830 is adapted to identify the desired foaming rising as features of certain volumes are recognized. In step E, the control unit 1860 of the coffee maker is increasing or decreasing the pressure of the milk foamer in order to expedite or slow down the desired foaming process.

Alternatively the identification process could be trained to only release steam for milk foaming if the nozzle is underneath the milk surface or not dived too deep into the milk. In another embodiment an acoustic pattern could be used to identify if the milk nozzle is dived too deep into the milk pitcher. Also it could be trained and then detected and then adjusted if a certain ratio of milk and foam and coffee is reached. In a grinding process a visual sensor and an opposing light source could be used to gather data from the coffee grind. A classifier could be trained to identify different particle sizes and set the grinder finer if the particle size is too coarse. Of course the throughput time of the brewing process could as well be used to adapt the grinder. A classifier could be trained to identify the right dispensing amount for the right container, including verifying the position of the cup or container. If the cup or container is not positioned correctly, the dispensing function could be blocked. In another variation it could be trained if a hand is visible in the dispensing area and dispensing of hot liquids could be blocked if a hand is detected. A classifier or classification unit 1850 could be trained to detect size and colour and quantity of coffee beans and to use this as feature data. A classifier could be trained to adapt a brewing procedure eventually including the temperature of a cup holder until a certain temperature such as 94 degree Celsius is reached for liquid dispensed in a cup. Classifiers 1850 could be trained to identify current feature data such as flow velocity, coffee present in certain area of an image, colour within bounding boxes of identified areas, height in cup of coffee, milk, milk foam or crema. Certain feature data could be extracted and used for training from the feature data space that are associated with certain service events, such as change of filters, cleanings and other events for preventive maintenance purposes. A classifier 1850 could be trained to detect overflow of a cup and stop the liquid dispense. A classifier could be trained to identify a certain degree of grease and initiate a cleaning procedure. The same can be used for initiating a sensor self-cleaning procedure if either dirt is detected or insufficient sensor performance is detected.

Coffee makers 100 can be programmed with a great numbers of different recipes and characteristics specific to water, coffee beans and milk in use. Once the coffee maker is changed in location or different ingredients or age of ingredients is used, the recipe settings may not reproduce the desired result. A monitoring system can be used to gather feature data and data characteristics in addition to the recipe settings of the desired outcome, such as this amount of water, with these grinding and brewing parameters with this kind of coffee beans and this amount of milk, with these foaming parameters shall result into a product of a certain data profile. With machine learning and the use of classifiers the coffee product result or its visual impression together with other feature data sourced, can be differentiated and the processing parameters can be adapted to recreate a consistent product outcome. Thus, a coffee maker could be installed and a self-calibration procedure of the coffee maker can be initiated in which the coffee maker produces a number of coffee drinks and adapts the coffee making parameters in order to recreate the previously trained data profile. In this scenario a skilled service technician may not be necessary for installation or recalibration of recipes anymore. This could be extended to train the software agent to identify events such as dispensing of water from a nozzle by identifying from colour lighter colour. This could be a sign of malfunction of the coffee maker, if water is dispensed when coffee would be expected and a service technician could be signalled who could via remote access resolve the problem.

Instead of placing the camera 160 behind a window next to the coffee or milk nozzle 140, it may as well be integrated with a door of an encapsulation of the cup holding area. It is advantageous to integrate a screen 170 or digital visual display on the coffee maker 100. This screen may show images captured from the monitoring camera. These images could also be stored or transmitted and be used for marketing or service purposes.

It further is possible to have an electrical connection such as a wire or electrical plugs at the mounting of the camera monitoring system 150. It is advantageous to reduce the heat effects onto the sensor system with IR coating of any window or lenses used. For the camera, image sensor, or photodiode array it is advantageous to apply an image rotation or movement correction algorithm in order to correct the rotation or food movement. This algorithm may be supported by a measured or pre-set parameter from the coffee maker control regarding any known movement speed. It may be advantageous to perform colour calibration, normalization or use of certain filters or techniques such as HDR on the images gathered from the camera.

The recognition of the food items such as beverages or food holding items such as cups of at least one sensor to be processed may be accomplished with the unique sensor data input matrix $D_a$. This sensor data input matrix or a reduced representation of it can be used to identify the food treatment process or dispensing or brewing or grinding process with its data characteristic or data fingerprint. The control unit has access to a database that enables to compare the sensor data input matrix with previously stored information, indicated with 3. This enables the control unit to choose a control program or processing procedure for the present food treatment. Part of this procedure is as object of this invention a mapping $X_c$ of the sensor data input matrix $D_a$ to actuator control data matrix $D_b$, $$D_a X_c = D_b. \quad \text{(Equation 1.00)}$$

With the actuator control data matrix $D_b$ the heat treatment machine or coffee maker controls the food or beverage processing or dispensing, for instance by controlling coffee maker control parameters such as energy supply or start and end time of processing. The heat treatment machine then operates in a closed-loop control mode. Typically, the sensor data input matrix $D_a$ is significantly higher in dimension compared to the actuator control data matrix $D_b$, it is advantageous to find the mapping $X_c$ as well as a reduced representation of the sensor data input matrix $D_a$ with methods known from machine learning. This is because the type of food to be processed and the according procedures is usually individually different. From a data processing point of view the relations between sensor data input and appropriate actuator output may be highly non-linear and time dependent. Today these parameters are chosen by human operators with significant know how in a time consuming configuration of the heat treatment machine. According to an embodiment with initial data sets learned from a human operator machine learning methods can perform the future system configuration and expedite configuration times as well as increase processing efficiency as well as quality such as in-cup coffee quality metrics. All applied data may be stored in databases. It is beneficial to connect the heat treatment machine or coffee machine with a network. With the means of this network, any database data may be exchanged. This enables a human operator to interact with several locally distributed heat treatment machines. In order to do so the heat treatment machine or coffee maker has equipment to interact with a network and use certain protocols such as Transmission Control Protocol (TCP) and Internet Protocol (IP). The heat treatment machine can be equipped with network devices for a local area network (LAN) a wireless area network (WLAN) or a mobile network access used in mobile telecommunication.

Food Processing Procedure:

The procedure includes a learning phase and a production phase. In the learning phase a human operator processes food or dispenses liquids or brews coffee. It is treated with heat or dispensed in an amount as desired by the human operator. After the processing with heat or dispensing or brewing the human operator may specify the learning target for the food or beverage such as volume of milk foam or coffee extraction level and when the desired process state or extraction level has been reached. The human operator can also provide information when the product was under-extracted, over-extracted and at desired process state. Using the described machine learning methods the machine calculates the processing parameters for future food production. Then the heat treatment machine or heat treatment machines or coffee makers in a connected network can be used to have additional learning phases or go into automated production. When in automated production the human operator just places a desired cup onto the cup holding area. The machine then detects the cup and the desired quality metrics and performs the previously learned heat treatment procedure or brewing or dispensing process. When the desired food process state has been reached or simply the machine ends the process. It can do so by giving the human operator a visual or acoustical signal. Further, the heat treatment machine may ask for feedback from the human operator. An automated pick and place or loading system that loads and unloads cup holding area may fully automate the procedure. For this purpose a robotic arm or a convection belt or a drop down mechanism may be used.

The present disclosure includes classifying a multitude of images recorded by a camera 160 observing a processing or dispensing area of food or beverages processed by heat or by filter and to a food processing machine or apparatus for making beverages 100 using the same.

Recent techniques in machine learning and the control of food processing have been examined to create adaptive monitoring. Artificial Neural Networks (ANN), Support Vector Machines (SVM), and the Fuzzy K-Nearest Neighbor (KNN) classification have been investigated as they apply to special applications for food or beverage processing. One aim is to evaluate what machine learning can accomplish without or only with partial use of a pre-programmed process model defined by a human operator.

Thus, the present disclosure takes advantage of cognitive capabilities in order to increase the heat or food or beverage treatment or dispensing machine in flexibility, quality, and efficiency. This can be further separated in four objects:

The present disclosure provides a system being able to gain knowledge by learning from a human expert how to abstract relevant information within food processing and how to operate a coffee maker, wherein the system should show reasonable behavior in unknown situations and should be able to learn unsupervised.

The present disclosure provides a system increasing the efficiency by closed-loop control of energy supply adapting to changes in processing time or other parameters and maintaining a desired food processing state or desired quality metric.

The present disclosure provides a system having flexibility for individually different food or beverage processing tasks by adapting to different types of food or liquids or process tasks.

In the following, a brief overview of the theories underlying the present disclosure is given. This includes techniques for reducing sensor data with dimensionality reduction, such as Principal Component Analysis, Linear Discriminant Analysis, and Isometric Feature Mapping. It also includes an introduction of classification and supervised as well as unsupervised learning methods such as Fuzzy K-Nearest Neighbor, Nearest Neighbor, Artificial Neural Networks, including large or high dimensional Artificial Neural Networks also known as Deep Learning, Support Vector Machines, reinforcement learning, Naïve Bayes Classifier, K Means Clustering, Apriori Algorithm, Linear Regression, Logistic Regression, Random Forests, Decision Trees. Depending on the food or beverage process, different techniques show better or worse results, in particular it is advantageous to combine these methods with each other or to program around a machine learning module certain business logic or processing rules so that only a part of a processing model needs to be achieved by methods of machine learning. For the number format, the thousand separator is a comma "," and the decimal separator is a point "."; thus, one-thousand is represented by the number 1,000.00.

Feature Extraction and Dimensionality Reduction

The present disclosure does not seek nor desire to achieve human-like behavior in machines. However, the investigation of something like cognitive capabilities within food processing or production machines of artificial agents or AI agents capable of managing food processing tasks may provide an application scenario for some of the most sophisticated approaches towards cognitive architectures. Approaches for production machines may be structured within a cognitive perception-action loop architecture, as shown in FIG. 1C, which also defines cognitive technical systems. Cognitive capabilities such as perception, learning, and gaining knowledge allow a machine to interact with an environment autonomously through sensors and actuators. Therefore, in the following, some methods known from machine learning that will be suitable for different parts of a cognitive perception-action loop working in a production system will be discussed.

If a cognitive technical system simply has a feature representation of its sensor data input, it may be able to handle a higher volume of data. Moreover, extracting features emphasizes or increases the signal-to-noise ratio by focusing on the more relevant information of a data set. However, there are many ways of extracting relevant features from a data set, the theoretical aspects of which are summarized in the following.

In order to select or learn features in a cognitive way, we want to have a method that can be applied completely autonomously, with no need for human supervision. One way of achieving this is to use dimensionality reduction (DR), where a data set X of size t×n is mapped onto a lower dimension data set Y of size t×p. In this context $\mathbb{R}^n$ is referred to as observation space and $\mathbb{R}^p$ as feature space. The idea is to identify or learn a higher dimensional manifold in a specific data set by creating a representation with a lower dimension.

Methods used to find features in a data set may be subdivided into two groups, linear and nonlinear, as shown in FIG. 1D. Linear dimensionality reduction techniques seem to be outperformed by nonlinear dimensionality reduction when the data set has a nonlinear structure. This comes with the cost that nonlinear techniques generally have longer execution times than linear techniques do. Furthermore, in contrast to nonlinear methods linear techniques allow a straightforward approach of mapping back and forth. The question is whether a linear dimensionality reduction technique is sufficient for food or beverage processing, or if nonlinear techniques bring more advantages than costs. The following nonlinear techniques are very advantageous for artificial data sets: Hessian LLE, Laplacian Eigenmaps, Locally Linear Embedding (LLE), Multilayer Autoencoders (ANN Aut), Kernel PCA, Multidimensional Scaling (MDS), Isometric Feature Mapping (Isomap), and others. As a result Isomap proves to be one the best tested algorithms for artificial data sets.

Principal Component Analysis

Principal Component Analysis (PCA) enables the discovery of features that separate a data set by variance. It identifies an independent set of features that represents as much variance as possible from a data set, but are lower in dimension. PCA is known in other disciplines as the Karhunen-Loève transform and the part referred as Singular Value Decomposition (SVD) is also a well-known name. It is frequently used in statistical pattern or face recognition. In a nutshell, it computes the dominant eigenvectors and eigenvalues of the covariance of a data set.

We want to find a lower-dimensional representation Y with t×p elements of a high-dimensional data set t×n mean adjusted matrix X, maintaining as much variance as possible and with decorrelated columns in order to compute a low-dimensional data representation $y_i$ for the data set $x_i$. Therefore PCA seeks a linear mapping $M_{PCA}$ of size n×p that maximizes the term $tr(M_{PCA}^T cov(X) M_{PCA})$, with $M_{PCA}^T M_{PCA} = I_p$ and cov(X) as the covariance matrix of X. By solving the eigenproblem with $$cov(X)M_{PCA} = M_{PCA}\Lambda \quad \text{(Equation 2.3)}$$

we obtain the p ordered principal eigenvalues with the diagonal matrix given by $\Lambda = diag(\lambda_1, \ldots, \lambda_p)$. The desired projection is given by $$Y = X M_{PCA}, \quad \text{(Equation 2.4)}$$

gives us the desired projection onto the linear basis $M_{PCA}$. It can be shown that the eigenvectors or principal components (PCs) that represent the variance within the high-dimensional data representation are given by the p first columns of the matrix $M_{PCA}$ sorted by variance. The value of p is determined by analysis of the residual variance reflecting the loss of information due to dimensionality reduction.

By finding an orthogonal linear combination of the variables with the largest variance, PCA reduces the dimension of the data. PCA is a very powerful tool for analyzing data sets. However, it may not always find the best lower-dimensional representation, especially if the original data set has a nonlinear structure.

Linear Discriminant Analysis

Despite the usefulness of the PCA, the Linear Discriminant Analysis (LDA) may be seen as a supervised dimensionality reduction technique. It can be categorized as using a linear method, because it also gives a linear mapping $M_{LDA}$ for a data set X to a lower-dimension matrix Y, as stated for $M_{PCA}$ in equation 2.4. The necessary supervision is a disadvantage if the underlying desire is to create a completely autonomous system. However, LDA supports an understanding of the nature of the sensor data because it can create features that represent a desired test data set.

Because the details of LDA and Fisher's discriminant are known, the following is a brief simplified overview. Assume we have the zero mean data X. A supervision process provides the class information to divide X into C classes with zero mean data $X_c$ for class c. We can compute this with $$S_w = \sum_{c=1}^{C} cov(X_c), \quad \text{(Equation 2.5)}$$

the within-class scatter $S_w$, a measure for the variance of class c data to its own mean. The between-class scatter $S_b$ follows $$S_b = cov(X) - S_w. \quad \text{(Equation 2.6)}$$

Between-class scatter is a measure of the variance of each class relative to the means of the other classes. We obtain the linear mapping $M_{LDA}$ by optimizing the ratio of the between-class and within-class scatter in the low-dimensional representation using the Fisher criterion, $$J(M) = \frac{M^T S_b M}{M^T S_w M}. \quad \text{(Equation 2.7)}$$

Maximizing the Fisher criterion by solving the eigenproblem for $S_w^{-1} S_b$ provides C−1 eigenvalues that are non-zero. Therefore, this procedure seeks the optimal features to separate the given classes in a subspace with linear projections.

LDA thus separates a low-dimensional representation with a maximized ratio of the variance between the classes to the variance within the classes.

Isometric Feature Mapping

The PCA and LDA methods produce linear mapping from a high-dimensional data set to a low-dimensional representation. This may be expressed as learning a manifold in an observation space and finding a representation for this in a lower-dimensional feature space. For data sets with a nonlinear structure, such as the artificial Swiss-roll data set, linear projections will lose the nonlinear character of the original manifold. Linear projections are not able to reduce the dimension in a concise way: data points in the feature space may appear nearby although they were not in the observation space. In order to address this problem, nonlinear dimensionality reduction techniques have recently been proposed relative to the linear techniques. However, it is a priori unclear whether nonlinear techniques will in fact outperform established linear techniques such as PCA and LDA for data from food processing sensor systems.

Isometric Feature Mapping or the Isomap algorithm attempts to preserve the pairwise geodesic or curvilinear distances between the data points in the observation space. In contrast to a Euclidean distance, which is the ordinary or direct distance between two points that can be measured with a ruler or the Pythagorean theorem, the geodesic distance is the distance between two points measured over the manifold in an observation space. In other words, we do not take the shortest path, but have to use neighboring data points as hubs to hop in between the data points. The geodesic distance of the data points $x_i$ in observation space may be estimated by constructing a neighborhood graph N that connects the data point with its K nearest neighbors in the data set X. A pairwise geodesic distance matrix may be constructed with the Dijkstra's shortest path algorithm. In order to reduce the dimensions and obtain a data set Y, multidimensional scaling (MDS) may be applied to the pairwise geodesic distance matrix. MDS seeks to retain the pairwise distances between the data points as much as possible. The first step is applying a stress function, such as the raw stress function given by $$\Phi(Y) = \sum_{ij} (\|x_i - x_j\| - \|y_i - y_j\|)^2, \quad \text{(Equation 2.8)}$$

in order to gain a measure for the quality or the error between the pairwise distances in the feature and observation spaces. Here, $\|x_i - x_j\|$ is the Euclidean distance of the data points $x_i$ and $x_j$ in the observation space with $y_i$ and $y_j$ being the same for the feature space. The stress function can be minimized by solving the eigenproblem of the pairwise distance matrix.

The Isomap algorithm thus reduces the dimension by retaining the pairwise geodesic distance between the data points as much as possible.

Classification for Machine Learning

In machine learning, it is not only the extraction of features that is of great scientific interest, but also the necessity of taking decisions and judging situations. Classification techniques may help a machine to differentiate between complicated situations, such as those found in food or beverage processing. Therefore classifiers use so-called classes that segment the existing data. These classes can be learned from a certain training data set. In the ongoing research into AI and cognitive machines, Artificial Neural Networks were developed relatively early in the process. In comparison, the concepts of Kernel Machines and reinforcement learning appeared only recently but showed increased cognitive capabilities.

Artificial Neural Networks

Artificial Neural Networks (ANN) have been discussed extensively for decades. ANN was one of the first successes in the history of Artificial Intelligence. Using natural brains as models, several artificial neurons are connected in a network topology in such a way that an ANN can learn to approximate functions such as pattern recognition. The model allows a neuron to activate its output if a certain threshold is reached or exceeded. This may be modeled using a threshold function. Natural neurons seem to "fire" with a binary threshold. However, it is also possible to use a sigmoid function, $$f(x) = \frac{1}{1 + e^{-vx}}, \quad \text{(Equation 2.9)}$$

with v as parameter of the transition. For every input connection, an adjustable weight factor $w_i$ is defined, which enables the ANN to realize the so-called learning paradigm. A threshold function o can be expressed using the weight factors W and the outputs from the preceding neurons P, $o = W^T P$, with a matrix-vector notation. The neurons can be layered in a feedforward structure, Multi-Layer Perceptron (MLP) or, for example, with infinite input response achieved using feedback loops with a delay element in so-called Recurrent Neural Networks. A MLP is a feedforward network with a layered structure; several hidden layers can be added if necessary to solve nonlinear problems. The MLP can be used with continuous threshold functions such as the sigmoid function in order to support the backpropagation algorithm stated below for supervised learning. This attempts to minimize the error E in $$E = \frac{1}{2} \sum_i (z_i - a_i)^2, \quad \text{(Equation 2.10)}$$

from the current output $a_i$ of the designated output $z_1$, where the particular weights are adjusted recursively. For an MLP with one hidden layer, if $h_j$ are hidden layer values, $e_i$ are input values, $\alpha \geq 0$ is the learn rate, and $\varepsilon_i = z_i - a_i$, then the weights of the hidden layer $w_{ij}^1$ and the input layer $w_{ij}^2$ are adjusted according to, $$\Delta w_{ij}^1 = \alpha \varepsilon_i h_j, \quad \text{(Equation 2.11)}$$

$$\Delta w_{ij}^2 = \alpha \sum_m e_m w_{mi}^1 e_j. \quad \text{(Equation 2.12)}$$

The layers are enumerated starting from the input to the output. For backpropagation, the weights are adjusted for the corresponding output vectors until the overall error cannot be further reduced. Finally, for a classification of C classes, the output layer can consist of either C output neurons, representing the probability of the respective class, or a single output neuron that has defined ranges for each class.

ANN can thus learn from or adapt to a training data set and can find a linear or a nonlinear function from N input neurons to C output neurons. This may be used for classification to differentiate a set of classes in a data set.

Kernel Machines

In general, a classification technique should serve the purpose of determining the probability of learned classes occurring based on the measured data. Classification can be mathematically formulated as a set of classes $c_i = c_1, \ldots, c_N$ in C, with a data set represented by $x_i \in \mathbb{R}^n$, and a probability of $p_i$, $$p_i = p(c_i | x_i) = f_c(x_i, \theta). \quad \text{(Equation 2.13)}$$

The parameter $\theta$ may then be chosen separately for every classification or can be learned from a training data set.

In order to achieve learning, it is desirable to facilitate efficient training algorithms and represent complicated nonlinear functions. Kernel machines or Support Vector Machines (SVM) can help with both goals. A simple explanation of SVM, or in this particular context Support Vector Classification (SVC), is as follows: in order to differentiate between two classes, good and bad, we need to draw a line and point out which is which; since an item cannot be both, a binary decision is necessary, $c_i \in [-1, 1]$. If we can only find a nonlinear separator for the two classes in low-dimensional space, we can find a linear representation for it in a higher-dimensional space, a hyperplane. In other words, if a linear separator is not possible in the actual space, an increase of dimension allows linear separation. For instance, we can map with function F a two-dimensional space $f_1 = x_1$, $f_2 = x_2$ with a circular separator to a three-dimensional space $f_I = x_1^2$, $f_{II} = x_2^2$, $f_{III} = \sqrt{2} x_1 x_2$ using a linear separator, as illustrated in FIG. 1E.

SVC seeks for this case an optimal linear separator, a hyperplane, $$H = \{x \in \mathbb{R}^3 | ox + b = 0\} \quad \text{(Equation 2.14)}$$

in the corresponding high-dimensional space for a set of classes $c_i$. In three-dimensional space, these can be separated with a hyperplane, H, where o is a normal vector of H, a perpendicular distance to the origin $|b|/\|o\|$, and o with an Euclidean norm of $\|o\|$. In order to find the hyperplane that serves as an optimal linear separator, SVC maximizes the margin given by, $$d(o, x_i; b) = \frac{|ox_i + b|}{\|o\|}, \quad \text{(Equation 2.15)}$$

between the hyperplane and the closest data points $x_i$. This may be achieved by minimizing the ratio $\|o\|^2/2$ and solving with the optimal Lagrange multiplier parameter $\alpha_i$. In order to do this, the expression, $$\sum_{i=1}^{l} \alpha_i + \frac{1}{2} \sum_{j=1}^{l} \sum_{k=1}^{l} \alpha_i \alpha_j c_i c_j (x_i \cdot x_j), \quad \text{(Equation 2.16)}$$

has to be maximized under the constraints $\alpha_i \geq 0$ and $\Sigma_i \alpha_i c_i = 0$. The optimal linear separator for an unbiased hyperplane is then given using, $$f(x) = \text{sign}\left(\sum_i \alpha_i c_i (x \cdot x_i)\right), \quad \text{(Equation 2.17)}$$

allowing a two-class classification.

SVM has two important properties: it is efficient in computational runtime and can be demonstrated with equations 2.16 and 2.17. First, the so-called support vectors or set of parameters $\alpha_i$ associated with each data point is zero, except for the points closest to the separator. The effective number of parameters defining the hyperplane is usually much less than l, increasing computational performance. Second, the data enter expression 2.16 only in the form of dot products of pairs of points. This allows the opportunity of applying the so-called kernel trick with $$x_i \cdot x_j \mapsto F(x_i) \cdot F(x_j) = K(x_i, x_j), \quad \text{(Equation 2.18)}$$

which often allows us to compute $F(x_i) \cdot F(x_j)$ without the need of knowing explicitly F. The kernel function $K(x_i, x_j)$ allows calculation of the dot product to the pairs of input data in the corresponding feature space directly. However, the kernel function applied throughout the present invention is the Gaussian Radial Basis Function and has to fulfill certain conditions, as in $$K_G(x_i, x_j) = e^{-\gamma \|x_i - x_j\|^2}, \quad \text{(Equation 2.19)}$$

with $\gamma$ as the adjustable kernel parameter.

Because we have so far discussed only binary decisions between two classes, we note here that it is also possible to enable soft and multi-class decisions. The latter can be achieved in steps by a pairwise coupling of each class $c_i$ against the remaining n−1 classes.

SVC can thus be used to learn complicated data. It structures this data in a set of classes in a timely fashion. Mapping into a higher-dimensional space and finding the optimal linear separator enables SVM to use efficient computational techniques such as support vectors and the kernel trick.

Fuzzy K-Nearest Neighbor

Unlike the previously discussed Support Vector Machines, a less complicated but highly efficient algorithm called the Fuzzy K-Nearest Neighbor (KNN) classifier can also separate classes within data. The algorithm can categorize unknown data by calculating the distance to a set of nearest neighbors.

Assume we have a set of n labeled samples with membership in a known group of classes. If a new sample x arrives, it is possible to calculate membership probability $p_i(x)$ for a certain class with the vector's distance to the members of the existing classes. If the probability of membership in class A is 90% compared to class B with 6% and C with just 4%, the best results seem to be apparent. In contrast, if the probability for membership in class A is 45% and 43% for class B, it is no longer obvious. Therefore KNN provides the membership information as a function to the K nearest neighbors and their membership in the possible classes. This may be summarized with $$p_i(x) = \frac{\sum_{j}^{K} p_{ij}\left(\frac{1}{\|x - x_j\|^{\frac{2}{m-1}}}\right)}{\sum_{j}^{K} \frac{1}{\|x - x_j\|^{\frac{2}{m-1}}}}, \quad \text{(Equation 2.20)}$$

where $p_{ij}$ is the membership probability in the ith class of the jth vector within the labeled sample set. The variable m is a weight for the distance and its influence in contributing to the calculated membership value.

When applied, we often set m=2 and the number of nearest neighbors K=20.

Reinforcement Learning

In contrast to previous learning methods, which learn functions or probability models from training data, reinforcement learning (RL) can facilitate learning using environmental feedback from an agent's own actions in the long-term, without the need for a teacher. This entails the difference between supervised and unsupervised learning. If a long-term goal is sought, positive environmental feedback, also known as reward or reinforcement, may support improvement. An agent may learn from rewards how to optimize its policy or strategy of interacting with the real world, the best policy being one that optimizes the expected total reward. RL does not require a complete prior model of the environment nor a full reward function. The artificial agents therefore indicate cognitive capability and act in a similar manner to animals, which may learn from negative results like pain and hunger and thirst and from positive rewards like pleasure and food or beverage intake. In this case we pick that the agent has to use a value function approach, in which it attempts to maximize its environmental return.

In RL, an agent takes actions, $a_t$, in an environment that it perceives to be its current state, $s_t$, in order to maximize long-term rewards, $r_t$, by learning a certain policy, $\pi$. However, before we can start learning with reinforcement we have to find answers regarding the appropriate agent design. The agent could try to maximize the expected return by estimating the return for a policy π. This agent behavior is also referred to as value function estimation. The agent may evaluate the action by estimating the state value using a state-value function $V_\pi(s)$, considering a certain policy $\pi_w$ that is continuously differentiable, as in $$V_\pi(s) = E\left(\sum_{t=0}^{\infty} \gamma^t r_t \mid s_0 = s\right).$$ (Equation 2.21)

Using this function the agent may estimate the expected return for a given state and a following policy. It could also estimate the expected return for an action, following a given state and policy. Therefore, the agent chooses an action considering the given state from the state-action function or Q-function, as in $$Q_\pi(s, a) = E\left(\sum_{t=0}^{\infty} \gamma^t r_t \mid s_0 = s, a_0 = a\right).$$ (Equation 2.22)

The next action therefore relies on a reward function $r_t$ and in order to allow the agent to grant a concession for expected future rewards over current rewards, the discount factor $0 \leq \gamma \leq 1$ may be selected. It is possible to set how much the agent should discount for future rewards, for instance future rewards are irrelevant for $\gamma=0$.

In RL, the methods may be subdivided into groups such as value function based methods or direct policy search. Many different actor-critic algorithms are value function based methods, estimating and optimizing the expected return for a policy. In order to realize a value function based method, the behavior for an artificial agent and the underlying control problem may be stated as a Markov decision process (MDP). The system perceives its environment over the continuous state set, where $s_t \in \mathbb{R}^k$ and $s_0$ as the initial state. It can choose from a possible set of actions $a_t \in \mathbb{R}^m$ in respect to a stochastic and parameterized policy defined as $\pi(a_t|s_t)=p(a_t|s_t, w_t)$, with the policy parameters $w \in \mathbb{R}^k$. With a learned policy, it can be mapped from states to actions with respect to the expected rewards $r_t \in \mathbb{R}$. The reward after each action relies on $r_t(s_t, a_t)$. If no environmental model is available, the mentioned actor-critic methods can potentially develop policy-finding algorithms. The name is derived from the theater, where an actor adapts its actions in response to feedback from a critic. This can be obtained using a given evaluation function as a weighted function of a set of features or a so-called basis function $\phi(s)$, which then gives the approximation of the state-value function with value function parameters v, as in $$V_\pi(s)=\phi(s)^T v$$ (Equation 2.23)

Improving the policy is an optimization issue that may be addressed with a policy gradient. The choice of the policy gradient method is critical for convergence and efficiency. Both seem to be met by the Natural Actor-Critic (NAC) algorithm, as described by J. Peters and S. Schaal, "Natural actor-critic", Neurocomputing, Vol. 71, no 7-9, pp. 1180-1190, 2008, where the actor improves using the critic's policy derivative g as in equation 2.24, $$g=\nabla_w \log \pi(a_t|s_t).$$ (Equation 2.24)

The steps for improvement of policy parameters of the NAC algorithm are then calculated using, $$w_{t+1}=w_t+\alpha \hat{g},$$ (Equation 2.25)

where α is the learning rate, and $\hat{g}$ is the natural gradient calculated using the Fisher metric or is derived from the policy as demonstrated within the mentioned NAC algorithm publication. The NAC algorithm with LSTD-Q is fully documented at table 1 on page 1183 of J. Peters and S. Schaal, "Natural actor-critic", Neurocomputing, vol. 71, no. 7-9, pp. 1180-1190, 2008. It is applied with a parameterized policy $\pi(a|s)=p(a|s, w)$ initial parameters $w=w_0$ comprising the following steps in pseudo code:

```
1:   START: Draw initial state s_0 ~ p(s_t) and select parameters
     A_{t+1} = 0; b_{t+1} = z_{t+1} = 0
2:   For t = 0,1,2,...do
3:      Execute: Draw action a_t ~ π(a_t|s_t) , observe next state
        s_{t+1} ~ p(s_{t+1} | s_t, a_t), and reward r_t = r(s_t, a_t).
4:      Critic Evaluation (LSTD-Q(λ)): Update
4.1:       basis functions: φ̃_t =[φ(s_{t+1})^T,0^T]^T, φ̂_t =[φ(s_t)^T, ∇_w logπ(a_t|s_t)^T]^T,
4.2:       statistics: z_{t+1} =λz_t + φ̂_t; A_{t+1} = A_t + z_{t+1}(φ̂_t − γ φ̃_t)^T; b_{t+1} =b_t + z_{t+1} r_t,
4.3:       critic parameters: [v_{t+1}^T, ĝ_{t+1}^T]^T =A_{t+1}^{-1} b_{t+1},
5:      Actor: If gradient estimate is accurate, update policy parameters
5.1:       w_{t+1} = w_t + α ĝ_{t+1} and forget (reset) statistics. END.
```

The basis functions $\phi(s)$ may be represented by mapping the sensor data input into a feature space as we discussed it elsewhere in this document. In this case the basis functions are equal to the feature values. The basis functions may as well be chosen differently or the agent may use raw sensor data. The basis function may as well incorporate adaptive methods or an own learning step, that maximizes with the reward function results.

It is important to note that other RL agents are applicable as well. Many other policy learning agent concepts may be applied. It furthermore is inventive to use other sources as reward signal $r_t$ besides the classification output or quality indicator. For instance it is possible to apply a post-process or pre-process sensor as reward signal source. The reward function could be the probability value between 0 and 1 or −1 to 1 of a measured data of a post-process sensor to be part of a good or bad class, which is determined by a classifier as described above. In case a pre-process sensor is used for giving a reward $r_t$. An RL agent could find a parameter set to achieve this goal. Thus reinforcement learning may be a step towards a long-term goal in that it entails learning a policy from given rewards using policy-finding algorithms such as the Natural Actor-Critic.

Cognitive Technical Architecture

An artificial agent is anything that perceives its environment through sensors and acts in consequence of this through actuators. An agent is defined as an architecture with a program. The inspirational role model for this is natural cognition, and we want to realize a similar acting cognition for technical systems. Therefore, the agent will be equipped with cognitive capabilities, such as abstracting information, learning, and decision making for a food equipment unit. As part of the process, this section introduces an architecture that creates and enables agents to manage production tasks. In order to do so, the agents follow a cognitive perception-action loop, by reading data from sensors and defining actions for actuators.

A natural cognitive capability is the capacity to abstract relevant information from a greater set of data and to differentiate between categories within this information. Transferring this concept from natural cognition to the world of mathematical data analysis, a combination of data reduction techniques and classification methods is used according to the present invention to achieve something that exhibits similar behavior. In industrial production, many production processes can be carried out using a black box model, focusing on the ins and outs of the box rather on than what actually happens inside. The connections to the black box that may be used in production systems are generally sensors and actuators. Sensors such as cameras, microphones, tactile sensors, and others monitor the production processes. These systems also need actuators, such as linear drives or robotic positioning, in order to interact with its environment. For every production process, these actuators have to be parameterized. In order to learn how an agent can adaptively control at least one parameter of these production systems, many combinations of self-learning algorithms, classification techniques, knowledge repositories, feature extraction methods, dimensionality reduction techniques, and manifold learning techniques could be used. The present invention provides also different controlling techniques, both open- and closed-loop, using multiple different sensors and actuators. After many simulations and experiments, a simple architecture that demonstrates how these techniques may be combined proved to be successful and reliable, at least for food and beverage processing. However, the food and beverage processes may be interpreted as a form of black box, and may thus be applicable to other types of production processes.

Figure 4:
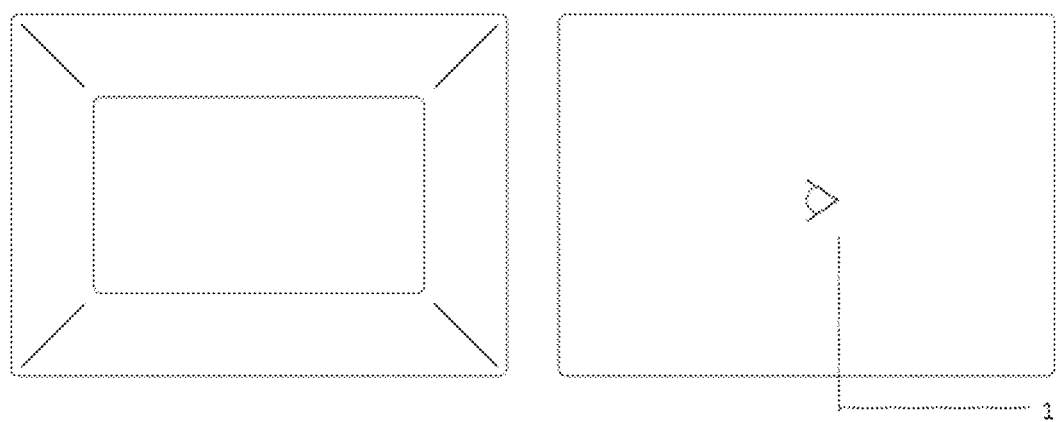
FIG. 4 shows a cognitive perception-action loop for food production machines with sensors and actuators.
Figure 5:
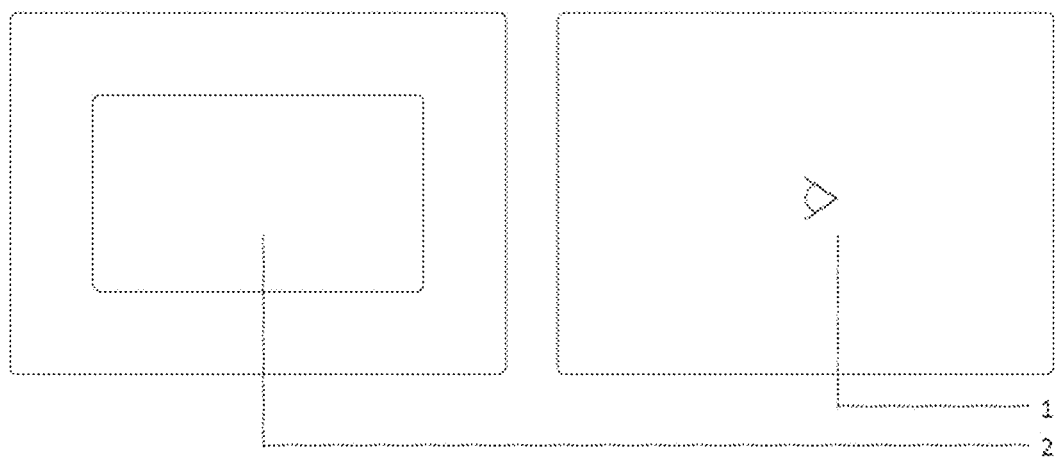
FIG. 5 shows a mapping of two-dimensional test data to a three-dimensional space with an optimal linear separator.
Figure 6:
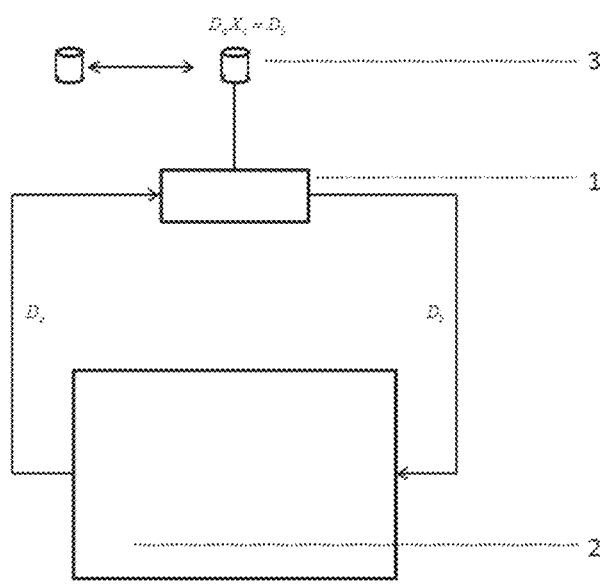
FIG. 6 shows an architecture and component groups of design agents for process monitoring or closed-loop control in food production systems using a black-box model with sensors and actuators.

FIGS. 4 to 6 illustrate a cognitive architecture that may be suitable for designing agents that can provide monitoring or adaptive process control for production tasks. The diagram describes the unit communication and information processing steps. Natural cognition seems to abstract information firstly by identifying representative symbolism, such as structured signals. A similar process can be accomplished using dimensionality reduction (DR), in which the agent uses a low-dimensional representation of the incoming sensor data. Natural cognition then recognizes whether or not knowledge about the incoming sensational events is already present. This step may be achieved by using classification techniques that categorize "sensorial" events or characteristics. A natural subject may decide to learn or to plan new actions. In order to replicate this, the architecture offers self-learning techniques that feeds a processing logic. In seeking to achieve quick reactions without the need to start a complex decision-making process, we may also "hardwire" a sensor input that can directly initiate an actuator in using a closed-loop control design. Therefore, the architecture may be designed in respect to four modes of usage, which will be discussed individually in the following: first, abstracting relevant information; second, receiving feedback from a human expert on how to monitor and control processes, or supervised learning; third, acting on learned knowledge; and fourth, autonomously controlling processes in previously unknown situations.

As with other cognitive architectures the aim here is creating agents with some kind of artificial intelligence or cognitive capabilities related to humans.

The agents may be composed of several components from different dimensionality reduction and classification techniques, which allow us to compare the performance of composed agents and modules in terms of overall food or beverage processing quality. Many different dimensionality reduction and classification techniques may be applicable, and some of these have been evaluated in the research project. The cognitive architecture offers the following modules for composing agents: Principal Component Analysis (PCA), Linear Discriminant Analysis (LDA), Isometric Feature Mapping (Isomap), Support Vector Machines (SVM), Fuzzy K-Nearest Neighbors (KNN), Artificial Neural Networks (ANN), and reinforcement learning (RL), along with some other methods. Three embodiments of control agents within this architecture would be agent A connecting Isomap, SVM, ANN, and PID energy supply control, or agent B connecting Isomap, SVM, and PID energy supply control, or agent C connecting ANN and Fuzzy KNN, for control.

Abstract Relevant Information

In natural human cognition, we abstract or absorb information from everything that we hear, feel, and see. Therefore, we only generally remember the most interesting things. Inspired by this, a technical cognitive system should similarly abstract relevant information from a production process. Working with abstracted features rather than with raw sensor data has certain advantages. Many weak sensor signals may be reduced in dimension to fewer but better signals, resulting in a more reliable feature. Additionally, in order to realize real-time process control, it is necessary to reduce the volume of the incoming sensor data because a greater amount of data may have a significant influence in causing longer execution times for the entire system.

The architecture of the present disclosure requires a test run in order to abstract initial information. During this period of agent training, the parameter range of the actuator that will be controlled is altered. In order to determine which information is most relevant, the agent should explore its own range of actions. After the initial reference test, the system analyzes the recorded sensor data in order to discover representative features. The agent may solve feature calculations separately for different kinds of sensors, but the sensory units should ideally be trained to map the sensory input into the learned feature space. Finding a useful representation of the feature space is critical because the system will only be able to recognize or react to changes in the feature values. The purpose of the cognitive processing used herein is to provide as much information as possible for the subsequent processing steps. However, the raw sensor data contains repetitions, correlations, and interdependencies that may be neglected. Therefore, in order to abstract the relevant information, the most significant features, or those that contain the most information, should be identified. In order to do this "cognitively", an agent should perform this task without the necessary supervision of a human expert. Therefore, a method of feature extraction is chosen that can be applied to all of the different kinds of processing tasks and the corresponding sensor data without the need to change parameterization or re-configuration. Manifold learning or dimensionality reduction techniques satisfy this need. They can reduce a sensor data set X of dimension n in observation space to a data set Y of dimension p in feature space. Often, the new quantity p is much less than n. However, many linear and nonlinear dimensionality reduction techniques have been tried and tested for different purposes. The present disclosure provides a suitable feature extraction technique for production workstations, complying with the following requirements: the feature extraction method works transparently and is able to display the processing steps to the user. The feature extraction method is able to run unsupervised. The feature extraction method is executable within a reasonable time-frame for configuration, especially during processing. The extracted features contain enough process information for reliable classification within several food loads or iterations of beverages.

In essence, PCA seeks orthogonal linear combinations that represent a greater data set. These may be calculated for incoming sensor data vectors. Exemplary video data and its principal components are demonstrated in FIG. 2E. These eigenvectors may serve as features for classification up to a threshold d. Feature extraction combined with classification may be achieved using Linear Discriminant Analysis. Analyzing the same data set using LDA and three learned quality classes defined as "good", "medium", and "bad" provides another set of features. Feature extraction may also be achieved using the Isomap algorithm. Unfortunately, the nonlinear feature cannot be displayed in the same way as the linear feature extraction of LDA and PCA. The extracted features of the methods named above are compared in the following. The LDA feature seems to contain more details than any one of the PCA features. Using this method of calculating, the LDA features seem to contain more process information in fewer features than PCA because they are especially designed to separate the desired classes. Furthermore, it is possible to display the calculated features using PCA and LDA in a way that makes these two methods more transparent than Isomap. The user gets an idea of what a process looked like if a feature is identified in a process video simply by looking at it. PCA and Isomap have the advantage that they can run unsupervised, which is not possible with LDA. Therefore, LDA merely serves as a comparison to PCA, but is not considered as an alternative for the desired architecture. Furthermore, the LDA feature seems to be very individualized for a particular process. Isomap has considerably higher execution times for analysis and out-of-sample extension. Therefore, if classification with PCA achieves sufficient results, then it is more applicable to the system under research. Therefore, the method of choice would be PCA, unless Isomap shows a significantly better performance We have to postpone the final choice of dimensionality reduction techniques because the most important quality measures are the experimental results, which are the basis.

In essence, dimensionality reduction may allow agents to abstract relevant information in terms of detecting variances and similarities during a training trial. This helps the agent to process only a few feature values compared to the significantly higher volume of raw sensor data. Furthermore, dimensionality reduction may support the perception of similarities in unknown situations, for instance similar food or beverage characteristics, even if these have not been part of the training. This may improve the adaptability of the agents to unknown but similar situations.

Supervised Learning from Human Experts

In natural human cognition, for instance in childhood, we often learn from others how to manage complex tasks. Similarly, a machine should have the possibility of learning its task initially from a human expert. Supervised learning seems to be the most efficient way of setting up a cognitive agent for production. In industrial production, a qualified human supervisor is usually present when the production system is being installed or configured. The architecture that we are examining uses human-machine communication in order to receive feedback from an expert, for instance through an intuitive graphical user interface on a touchscreen tablet computer. As mentioned above, at least one test action per actuator or test run is needed in this architecture as an initial learning phase. During these tests, the agent executes one actuator from within the desired range of actions, and the sensor data input is stored. After this run, an expert provides feedback concerning whether the robot has executed the actuator correctly, or if the action was unsuccessful or undesirable. The feedback may come in many different categories so that different kinds of failures and exit strategies may be defined. A classification technique may then collect the features together with the corresponding supervisory feedback. Combined with lookup tables, the classifier module will serve as knowledge and as a planning repository for a classification of the current system state. How an agent may perform its own actions and give itself feedback will be of importance for the next section; this section mainly covers the cognitive capability of learning from a human expert, and the application of this knowledge for monitoring purposes.

Support Vector Machines, Fuzzy K-Nearest Neighbor, and Artificial Neural Networks as classification techniques will now be discussed. The more that the human expert teaches the machine, the likelier it is that the system will achieve the desired goal. In order to save costs, the necessary human supervisor time should be minimized to just one or two reference tests, if possible.

The previous discussion shows how agents in the investigated cognitive architecture perceive their surroundings and learn from a human expert, as well as displaying their knowledge in terms of monitoring. The provided monitoring signal based on selected features is obtained from different sensors that are interpreted using a trained classifier. This monitoring signal seems to have improved quality and may be applicable to the control of process parameters. The agent would then change its position from observing the processing to actually acting upon the gained knowledge. However, if an agent is also applicable to process control in industrial processing, it has to fulfill many requirements with a performance close to perfection. The following are some of the requirements for the underlying cognitive architecture: The process control module should be capable of completing at least one control-cycle from sensor input to actuator output before the interaction zone has moved on. The controlled parameter should have an effect on the process outcome when altered, while simultaneously responding in a timely fashion. The process control module should be optimized in terms of providing a balance of reliable stability and necessary dynamics.

In order to realize a robust process control that is suitable for industrial production processes, a fast or real-time closed-loop control is often required. The advantage of the architecture under investigation is that the use of features rather than raw sensor data permits faster completion of control-loops with a minimal loss of information. In this architecture, any kind of controller design may be implemented that fits with the classification output. A simple version would have three possible classification output values: under baked, class I; correct, class II; and over baked, class III. This may be expressed using $$y_e = [-1\ 0\ 1] \begin{bmatrix} p_I \\ p_{II} \\ p_{III} \end{bmatrix}, \qquad \text{(Equation 3.1)}$$

where p are the class probabilities and $y_e$ the quality indicator.

A PID controller could adjust a parameter of the system's actuators according to the monitoring signal discussed above concerning supervised learning from human experts. Combining PID-control with the classification results enables the agents to perform energy supplied controlled processing. This can be realized as shown in $$c_t = Pe_t + I \sum_{i=t-n}^{t-1} e_i + D(e_t - e_{t-1}), \qquad \text{(Equation 3.2)}$$

with P for proportional, I for integral, and D for derivative behavior. The goal is to minimize the error $e_t$ between the quality indicator $y_e$, the output of the classification module, and the desired value of 0.0. In this context, the inventive applicability of the desired value in dependency of a probability class related quality indicator gives the opportunity to vary this value to optimize the desired process results. One approach describes a PID control with an ANN and corresponding experiments. Another investigates the usage of an SVM classification module to control food or beverage processing.

As suggested, a self-learning mechanism is integrated into the system. A novelty check on the basis of the trained features can detect new or previously unknown situations. In these cases, the system performs another test action and classifies the new food or beverage using the previously trained features. This time, it does not need to consult a human expert; it can map the gained knowledge onto the new food or beverage item autonomously and can adjust the process control appropriately.

In order to achieve process feedback control, the monitoring signal $y_e$ is used as the control variable. As actuating variable, which could possibly be any alterable process parameter with interrelationship to $y_e$, the energy supply seems suitable for its low inertia and its strong relation to $y_e$. Its magnitude is calculated by the PID algorithm as shown in equation 3.2. In order to achieve process control, the agent closes the loop by connecting the monitoring signal to a PID controller, as is shown in equation 3.2. The feedback controller is designed as a single-input-single-output (SISO) control system, which receives the monitoring signal $y_e$ from the classification unit, with $0 < y_e \le 1$ for too low and $-1 \le y_e < 0$ for too high energy supply, and uses this as reference value to minimize controller error.

The previous description outlined how the cognitive agents learned from human expert feedback. It should be possible for the cognitive system to learn from its own actions, or to give itself feedback. This kind of cognitive capability may be attained with reinforcement learning (RL). A classifier may take over the role of giving feedback and provide a RL agent with rewards for its own actions. The agent then learns a policy on how to act or how to process food based on the feedback or on rewards received for its previous performance. In order to test this, the learning task is therefore for the agent to learn how to process food or beverage on the basis of gained knowledge at different velocities without further human expert supervision.

In order to achieve the given learning task using reinforcement learning, a reliable reward function is needed. As the system has multiple sensor data inputs, a classifier identifying features of a desired food or beverage processing result, such as a Support Vector Machine, may serve as reward function $r_t$, as is shown in FIG. 23. These rewards may fulfill the role of a critic in the Natural Actor-Critic method, which is described before. Therefore, the next action that the agent chooses is absolute energy supply, $a_t$. The chosen action depends on the learned policy, as is shown in $$\pi(a_t | s_t) = p(a_t | s_t, w_t). \qquad \text{(Equation 4.1)}$$

The policy parameters $w_t$ relies on the gradient $\hat{g}$ and $w_{t-1}$, as in equation 2.25. However, for a full review of the applied algorithm please consult the Natural Actor-Critic Algorithm with least-squares temporal difference learning, LSTD-Q ($\lambda$). The policy should enable the agent to map from states, $s_t$, to actions, $a_t$, by learning from rewards, $r_t$. The rewards naturally influence the policy parameters. The best policy of the RL agent under investigation has been found with a sigma function, $$\pi(\phi(a_t | s_t)) = L_m \frac{1}{1 + e^{-w_t^T \phi(s_t)}} + \eta \Rightarrow a_{t+1}, \qquad \text{(Equation 4.2)}$$

where $L_m$ is the maximum allowed power and $\eta$ is the exploration noise determined by the product of a random number from $-1$ to $1$ and the exploration parameter $\varepsilon$.

The present disclosure has investigated modules that are suitable for a cognitive architecture for food or beverage production machines within a cognitive perception-action loop connecting sensors and actuators. Cognitive capabilities are: to abstract relevant information; to learn from a human expert; to use the gained knowledge to make decisions; and to learn how to handle situations that the agent has not previously been trained in.

As described above, it is possible to detect the movement of a sensor or optical system relative to the food or liquid with optical flow detection. An example for illustrating the principle of this technique of optical flow detection is described in Horn and Schunk "Determining optical flow".

The video data of a camera or suitable optical sensor data may be analyzed with the method of optical flow detection resulting in one or several vectors pointing toward the direction of the relative movement. By comparison of successive image frames, a translation and/or rotation within the 2D-image plane could be detected. Thus, taking additionally time delay between the successive frames into account, a velocity/matrix vector could also be calculated.

We have thoroughly investigated and developed "perception", "cognition", and "action" (P-C-A) loops, cognitive agents, and machine learning techniques suitable for industrial processes with actuators and intelligent sensors. Transferring cognitive capabilities, knowledge, and skills, as well as creating many interacting P-C-A loops is our next aim towards the cognitive factory.

Only very few food or beverage production processes are unique. The majority of food or beverage production processes run at different facilities or at different times performing identical tasks in similar environments. Still, often no or limited information exchange exists between these processes. The same food or beverage processing stations often require an individual configuration of every entity managing similar process tasks. In order to increase the capability of machines to help each other we will combine in space or time distributed P-C-A loops. Certain topics arise to approach this aim: In order to enable skill transfer between different entities we need to establish a reliable and adaptable Multi-P-C-A-loop topology. This meta-system should be able to identify similar processes, translate sensor data, acquire features, and analyze results of the different entities. Dimensionality reduction, clustering, and classification techniques may enable the machines to communicate on higher levels. Machine-machine trust models, collective learning, and knowledge representation are essential for this purpose. Furthermore some industrial processes may be redefined to optimize the overall performance in cognitive terms. Both data processing and hardware configuration should result in a secure, reliable, and powerful procedure to share information and transfer skills.

Using self-optimizing algorithms for control or parameterization of industrial applications offers the possibility to continuously improve the individual knowledge base. Reinforcement learning, for instance, gives a set of methods that provide this possibility. These algorithms rely on exploration in the processes state-space in order to learn the optimal state-action combinations. A reinforcement learning agent can also be described by a simple P-C-A-Loop, where the process of evaluating the state information of the environment is the "perception" element of the loop, the alteration of current control laws represents the "action" part and the process of mapping estimated state information to new control laws gives the "cognition" section of the single P-C-A loop. In industrial applications exploring a large state-space is not always feasible for various reasons like safety, speed, or costs. Using the Multi-P-C-A-Loop approach for distributing the learning task over multiple agents, can reduce the amount of exploration for the individual agent, while the amount of learning experience still remains high. It furthermore enables the teaching among different P-C-A loops. A possible assignment for the Multi-P-C-A approach is the combination of multiple agents in one system or assembly line, for instance a monitoring and a closed-loop control unit. Two different agents could be trained for optimization of different process parameters. The combination of both on a Multi-P-C-A level could be used to find an optimal path for all parameters.

Both outlined Multi-P-C-A-Loops may improve production or processing performance in setup and configuration times, process flexibility as well as quality. One approach combines and jointly improves similar workstations with joint knowledge and skill transfer. The other enables different units to self-improve with each others feedback.

In the following, a networking system for cognitive processing devices according to the present invention should be described.

It is an advantage of the present disclosure, that, once the collaborative systems gain enough machine knowledge, they avoid repetitive configuration steps and may significantly reduce down times as well as increase product flexibility.

According to one embodiment, in order to facilitate the integration of several cognitive control systems, all distributed systems are connected to each other via internet. The knowledge gained by these systems is shared, thus allowing a global database of process configurations, sensor setups and quality benchmarks.

In order to share information between machines, all of them have to use a similar method of feature acquisition.

As a first scenario to achieve these goals using cognitive data processing approaches for combining the input data from multiple sensors in order to receive a good estimation of the state the process is currently in. The systems will be composed of a coaxially mounted camera, photodiodes, and an optical interferometric sensor.

Using cognitive dimensionality reduction techniques, unnecessary and redundant data from these sensors can be removed. The reduced sensor data is used to classify the state of the process. Clustering allows for identification of specific process states, even between different set-ups. If a significant difference from the references, and therefore an unknown process condition, is detected, the supervisor will be alerted. The expert can then teach the new state and countermeasures (if possible) to the system in order to improve its performance.

The cognitive system to be developed should be able to learn to separate acceptable and unacceptable results and furthermore be able to avoid unacceptable results where possible. The usage of technical cognition eliminates the need for a complete physical model of the food or beverage process. The system is able to stabilize the process by improving at least one steering variable. Distributed cognition allows for a central database between different production locations. The information gathered from one process can be transferred to a similar process at a different location.

In the following, an embodiment of a monitoring system 150 illustrated in FIG. 7 will be described. The apparatus for making beverages comprises an apparatus 100 or beverage machine 100 and a monitoring system or apparatus 150.

Figure 7:
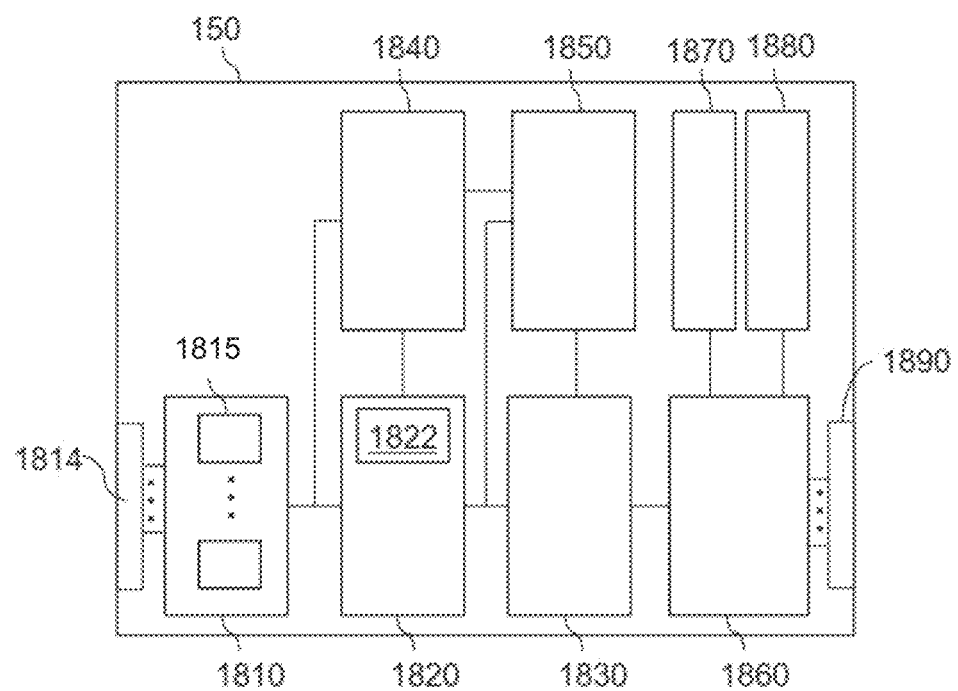
FIG. 7 shows a block diagram of an embodiment of a heat treatment monitoring system.

A block diagram of an embodiment of the monitoring apparatus 150 is shown in FIG. 7. The monitoring apparatus 150, accordingly, comprises a sensor unit 1810 having at least one sensor 1815 to determine current sensor data of food being heated, a processing unit 1820 to determine current feature data from the current sensor data, and a monitoring unit 1830 adapted to determine a current state in a beverage making process by comparing the current feature data with reference feature data of a reference beverage making process. The monitoring system 150 further comprises a learning unit 1840 adapted to determine a mapping of current sensor data to current feature data, and to determine reference feature data of a reference heating process based on feature data of at least one training beverage making process. The monitoring apparatus 150 further comprises a classification unit 1850 adapted to classify the type of beverage container to be used and to choose a reference beverage making process corresponding to the determined type of beverage container. It should be emphasized that the respective units 1820, 1830, 1840, and 1850 may be provided separately or may also be implemented as software being executed by a CPU of the monitoring apparatus 150.

The sensor unit 1810 comprises at least one sensor 1815, wherein a sensor 1815 may be any sensor as described in the description above, in particular a camera 160 as described with respect to FIGS. 1 to 3, any sensor of the sensor system. In particular, the at least one sensor 1815 of the sensor unit 1810 comprises at least one of hygrometer, temperature sensor, treatment chamber temperature sensor, acoustic sensors, scales, timer, camera, image sensor, array of photodiodes, a gas analyser of the gas inside the treatment chamber, means for determining temperature profiles of insertion temperature sensors, means for determining electromagnetic or acoustic process emissions of the beverage to be treated like light or sound being reflected or emitted in response to light or sound emitters or sources, means for determining results from 3D measurements of the food to be heated including 3D or stereo camera systems or radar, or means for determining the type or constitution or pattern or optical characteristics or volume or the mass of the food to be treated.

According to this embodiment it is beneficial to use as much sensor data as input as feasible. Which sensor signal provides the best information is hard to predict. As the algorithms detect the variance of a reference beverage making run, the learning unit 1840 used to implement machine learning may choose different sensor data for individually different baking products. Sometimes, volume and color variance may be the most significant data, sometimes it may be humidity, temperature and weight.

In an embodiment, the sensor unit 1810 comprises the camera 160 as the only sensor 1815, which leads to the advantage that no further sensor has to be integrated in the monitoring apparatus 150. Thus, the monitoring apparatus 150 may be formed as a single and compact casing being mounted to a front side of the apparatus 100. It is, however, also possible to provide a sensor data input interface 1814 at the monitoring apparatus 150, by which current sensor data of the above mentioned sensors can be read by the sensor unit 1810 and transferred to the processing unit 1820. The current sensor data of the sensors 1815 are not necessarily raw data but can be pre-processed, like HDR pre-processed pixel data of the camera 160 or pre-processed sensor data of the laser triangulation sensors, which may contain, e.g, a calculated value of volume of the observed food piece. The monitoring system 150 is the integrated within the apparatus 100.

The processing unit 1820, the monitoring unit 1830, the learning unit 1840 and the classification unit 1850 cooperate to provide a user with an optimized beverage producing result based on machine learning techniques as described above.

Herein, the processing unit 1820 and the learning unit 1840 are provided to reduce the amount of current sensor data of the above at least one sensor 1812. In particular, the processing unit 1820 and/or the learning unit 1840 is adapted to determine a mapping of current sensor data to current feature data by means of a variance analysis of at least one training heating process, to reduce the dimensionality of the current sensor data. The learning unit 1840 may be integrated in the monitoring apparatus 150 or may be an external unit located at another place, wherein a data connection may be provided, e.g. via Internet (as described below with regard to the usage of PCA-loops). The at least one training beverage making process may thus be based on current sensor data of the sensor unit 1810 of the local monitoring apparatus 150, but also be based on current sensor data of sensor units of further monitoring apparatuses at different places (on the world), provided the case the type of sensor data is comparable with each other. By means of training beverage making processes, the sensor data are reduced in dimensionality, wherein sensor data with the highest variance over time is weighted most.

The variance analysis performed by the learning unit 1840 comprises at least one of principal component analysis (PCA), isometric feature mapping (ISOMAP) or linear Discriminant analysis (LDA), or a dimensionality reduction technique, which have been described in all detail above.

An interpretation and selection of dominant features may thus be performed by applying PCA or principle component analysis to a sequence of food processing data. As described above in this way the features may be sorted by variance and the most prominent may be very beneficial for monitoring. By performing the analysis as described above, a mapping can be derived for mapping sensor data to feature data being reduced in dimensionality and being characteristic for the beverage making process being performed and being monitored by the monitoring apparatus 150. The mapping, which may be also received from an external server, or may be stored in a memory in the monitoring apparatus 150, is then applied by the processing unit 1820 to map the incoming current sensor data from the sensor unit 1810 to current feature data, which are then transmitted to the monitoring unit 1830. It is emphasized that in some cases, the "mapping" might be for some sensor data an identify mapping, thus some of the sensor data might be equal to the respective feature data, in particular with regard to pre-processed sensor data already containing characteristic values like the absolute temperature within the heating chamber, a volume value of the beverage to be produced, a humidity value of the humidity within the heating chamber. However, the mapping is preferably a mapping, in which the dimensionality of the data is reduced. The learning unit 1840 may be further adapted to determine a mapping of current feature data to feature data by means of a variance analysis of at least one training heating process to reduce the dimensionality of the current feature data.

The monitoring unit 1830 is then adapted to determine a current heating process state in a current heating process of monitored food by comparing the current feature data with reference feature data of a reference heating process.

During monitoring, one of the desired interests is to interpret the current feature data and arrive with a decision about regular and irregular processing. With the named method it is possible to collect features of regular behaviour and then assume irregular behaviour, once feature values differ from the previously learned regular behaviour. This may be supported by including classifiers such as Support Vector Machines or k-nearest neighbours as described above. The monitoring unit 1830 may be adapted to determine at least one action of at least one actuator based on the determined current feature data or current heating process state, wherein the control unit as described above may be implemented in the monitoring unit 1830. Thus, the monitoring unit 1830 may be adapted to execute all machine learning techniques as described above.

The control unit 1860 is further connected to an output interface 1890 for controlling, in dependence of a current beverage production state determined by the monitoring unit 1830, actuators as described above or below like a temperature control or time control of a beverage making chamber, or the bean grinder. The actuators may further include means for adapting the grinder strength, the grinder running time, the steam pressure for making coffee, and/or the steam supply time. The monitoring system may further comprise an alert unit 1870 and a display unit 1880 being connected to the control unit 1860.

As discussed above, the monitoring system 150 for an apparatus 100 for making beverages according to an embodiment may comprise a sensor unit 1810 having at least one sensor 1815 to determine current sensor data of a beverage production environment; a processing unit 1820 to determine current feature data from the current sensor data; and a monitoring unit 1830 adapted to determine a current beverage production state by comparing the current feature data with reference feature data of a reference beverage production process, and a control unit 1860 for controlling actuators in dependence of a current beverage production state determined by the monitoring unit 1830. Herein, the beverage production environment may include all places being relevant for the beverage production such as the treatment area 110 or parts of the apparatus, in which certain processes for the beverage production are performed such as the brewing chamber, the grinding chamber, the bean container, for example.

The system 150 may further comprise a learning unit 1840 being adapted to determine reference feature data of a reference beverage production process by combining predetermined feature data of a beverage production program with a training set of feature data of at least one training beverage production process being classified as being part of the training set by an user preference.

The system 150 may further comprise a recording unit 1822 to record current feature data of a current beverage production process, wherein the learning unit 1840 is adapted to receive the recorded feature data from the recording unit 1822 to be used as feature data of a training beverage production process.

The learning unit 1840 may be adapted to determine a mapping of current sensor data to current feature data and/or to determine reference feature data of a reference beverage production process based on feature data of at least one training beverage production process. The mapping may include a dimensionality reduction technique as discussed above. Furthermore, face recognition techniques may be implemented for determining the type or size of a beverage container, for example.

The system 150 may further comprise a classification unit 1850 adapted to classify the type of beverage container to be filled and to choose a reference beverage production process corresponding to the determined type of beverage container. A beverage container can be a cup, a mug, a pot or any other container being adapted to accommodate cold or hot beverages. Beverages in the sense of the invention shall be every food being drinkable or being liquid, such as lemonade, coffee, tea, water, milk or even soup.

The sensor unit 1810 may comprise a camera 160 recording a pixel image of a cup placement area or treatment area 110, wherein the current sensor data of the camera 160 corresponds to the current pixel data of a current pixel image.

The monitoring unit 1830 may be adapted to identify an empty cup holding area by classifying current feature data, and the control unit 1860 may be adapted to prevent a beverage dispensing process in case an empty cup holding area is identified by the monitoring unit 1830. Herein, current feature data may be derived from camera image data. However, feature data may be also a mapped sensor data of a plurality of sensors as discussed above.

The monitoring unit 1830 may be adapted to identify the size and/or type of a beverage container 120 being placed in a treatment area 110 by classifying current feature data, and the control unit 1860 may be adapted to preselect at least one beverage making program in dependence of the cup size and/or cup type identified by the monitoring unit 1830. In other words, pursuant to the present disclosure, the type of a cup may be determined (e.g. Espresso cup or Cappuccino cup) and further, after determining the type of the cup, the size may be determined (e g small, medium, large cappuccino cup). After determination of type of the cup in the cup holding area 110 or treatment area 110, a user can choose from at least one preselected beverage making program (e.g. small, medium, large espresso) while a selection of cappuccino is not possible, preventing an overflow of coffee when choosing the wrong program.

The monitoring unit 1830 may be adapted to identify a filling state of a beverage container 120 being placed in a treatment area 110 by classifying current feature data, and the control unit 1860 may be adapted to start or to stop dispensing a beverage in dependence of the filling state identified by the monitoring unit 1830. By doing this, a perfect filling of the beverage within the beverage container can be achieved.

The monitoring unit 1830 may be adapted to identify a desired coffee foaming level by repeatedly identifying the filling state, and the control unit 1860 may be adapted to stop a milk dispensing or foaming process as the desired milk foam or beverage container filling is reached. Thus, an overflow of milk can be prevented. Repeatedly identifying means that the monitoring system 150 repeats the identification or classification process with a predetermined clock rate (which may be in a range of milliseconds) to be sufficiently responsive to a beverage making process or beverage filling process.

The monitoring unit 1830 may be adapted to identify the rising speed of milk foam by repeatedly identifying the filling state, and the control unit 1860 may be adapted to increase or decrease the pressure of a milk foamer in order to expedite or slow down the desired foaming process.

The monitoring unit 1830 may be adapted to identify the colour of a top surface of a beverage in a beverage container 120 in a treatment area 110 by classifying current feature data, and the control unit 1860 may be adapted to adapt the beverage making process in dependence of the beverage colour identified by the monitoring unit 1830.

The monitoring unit 1830 may be adapted to identify crema present on top of the beverage in the beverage container 120 in the treatment area 110 by identifying the colour of the top surface of the beverage in the beverage container 120 in the treatment area 110, and the control unit 1860 may be adapted to increase degree of grinding of the coffee beans in case crema is not present on top of the beverage.

The monitoring unit 1830 may be adapted to identify a desired coffee extraction level by identifying the colour of the top surface of the beverage in the beverage container 120 in the treatment area 110, and the control unit 1860 may be adapted to stop the dispensing process as the desired extraction level is reached.

The monitoring unit 1830 may be adapted to identify certain data profiles for different coffee beans processed by classifying current feature data, and the control unit 1860 may be adapted to output information that unknown or unsuitable coffee beans are used.

An apparatus 100 for making beverages may comprise a beverage machine for making beverages; and the monitoring system 150.

Identification of slight variations in the color brown presents challenges for machine automation. This identification is desirable to determine the strength of brewed beverages such as coffee, whether or not cream or related products have been added to the beverage, the ratio of beverage to cream or related products, or the amount of cream products added to a beverage of a given size. Environmental illumination is often unpredictable and presents further challenges for the identification of slight discolorations. To compensate for these environmental discolorations, machine learning techniques may be applied.

Supervised learning techniques may be used to calibrate an installed system to compensate for external environmental illumination. Labeled images may be used to map specific pixel colors to a corresponding feature data such as strength of brewed beverages such as coffee, whether or not cream or related products have been added to the beverage, or the ratio of beverage to cream or related products. Images may be recorded, labeled with feature data such as beverage strength or ratio of beverage to cream or related products, and used as training data to aid the learning unit 1840 in mapping of accurate colors to feature data.

Environmental illumination is not static even in a stationary system. Natural light changes throughout the day, artificial lights malfunction or are switched on and off, and new illumination sources can be installed or removed near the system. All of these factors may affect the pixel data and its subsequent mapping to feature data.

Unsupervised learning techniques such as clustering are useful for maintaining a desired preparation process in view of changing environmental conditions such as lighting. Bulk data such as images can be collected and grouped by parameters such as pixel color. Changes to environmental illumination would affect these images in a similar fashion, so that clusters could be identified even in changed lighting conditions. The grouping of images into clusters can be used to identify when systematic changes such as environmental lighting have occurred, affecting the pixel data.

Reinforcement learning techniques such as sampling may be used to maintain or continuously improve the level of accuracy in beverage production process such as strength of brewed beverages such as coffee, whether or not cream or related products are added to the beverage, or the ratio of beverage to cream or related products. Sensor data may be sampled at intervals, each sample can be labeled either manually or automatically, and then samples can be used to train the system and to continuously improve its performance, or to adapt the system to changing environmental conditions.

It is advantageous in busy food service environments to implement simple steps such as the placement and removal of beverage containers in the beverage dispensing area, placement occurring before and removal occurring after the filling process. If this step is combined with a dispensing apparatus which can detect the filling state of a beverage container, and can adapt its dispensing process according to the filling state of the beverage container, there can be a solution which pours several beverages in succession with no human intervention.

According to an embodiment, a rotating belt contains several receptacles such as cup holders for holding beverage containers such as coffee cups. Beverage containers are placed into the receptacles as needed, and the belt is rotated so that one of the receptacles holding a container is in the dispensing area. The filling process begins and ends while the container is in the dispensing area, and then the belt rotates again so that the next receptacle is in the dispensing area.

It is advantageous to further implement the placement of a beverage container into the belt. An order input by a staff member or directly by a customer, including a specified beverage, can trigger a signal to a beverage container dispenser. The beverage container dispenser can dispense into the rotating belt an appropriate beverage container corresponding to the selected beverage. The rotating belt can move the automatically placed beverage into the beverage dispensing area, hold it there during the filling process, and then move the beverage out of the dispensing area and/or into a serving area.

The invention claimed is:
1. A system, comprising:
a sensor arranged to capture an image of a top surface of a beverage being poured;
a monitoring and control subsystem, including a processor, configured to:
determine a state of the beverage being poured according to a classification of pixels representing the top surface; and
control an actuator to adjust pouring of the beverage in response to the state of the beverage that was determined according to the classification of pixels representing the top surface to signal an apparatus to pre-select a beverage making program based on a size or type of an identified beverage container or to stop dispensing the beverage based on an identified container filling state,
wherein the state of the beverage being poured according to the classification of pixels includes a speed at which foam at the top surface of the beverage is rising by repeatedly identifying the filling state.

2. The system of claim 1, wherein the actuator controls a pressure under which the beverage is being poured.

3. The system of claim 1, wherein the actuator is additionally to control placement of a beverage container into a dispensing area.

4. The system of claim 1, wherein the captured image represents a coffee beverage being poured, and wherein the determined state of the coffee beverage being poured indicates that unsuitable coffee beans or unsuitable ingredients were used during execution of the beverage making program.

5. The system of claim 1, wherein the beverage comprises a drinkable food or a soup.

6. The system of claim 1, wherein the actuator controls a fill level based on an extraction level based on the color of the top surface of the beverage.

7. The system of claim 1, wherein the classification is according to a classifier trained with training images associated with respective states of the beverage being poured.

8. The system of claim 1, wherein the monitoring and control subsystem is further configured to classify a type of beverage container to be filled, wherein the classification of the pixels representing the top surface is performed according to the type of beverage container.

9. The system of claim 1, wherein the monitoring and control subsystem is further configured to identify the image from the sensor as including an empty beverage container holding area, and to control the actuator based on the image from the sensor including the empty beverage container holding area.

10. The system of claim 1, wherein the beverage making program includes processing of a mashed or mixed food item.

11. A system, comprising:
a sensor arranged to capture an image of a dispensing area;
a monitoring and control subsystem, including a processor, configured to:
determine a current beverage production state according to a classification of pixels representing the dispensing area, wherein the state of the beverage being poured according to the classification of pixels includes a speed at which foam at the top surface of the beverage is rising by repeatedly identifying the filling state; and
control an actuator to prevent pouring of the current beverage in response to the classification indicating that the dispensing area is empty.

12. The system of claim 11, wherein the monitoring and control system is additionally configured to:
initiate execution of a beverage making program based on a size or type of an identified beverage container in the dispensing area.

13. The system of claim 11, wherein the monitoring and control system is additionally configured to:
   stop dispensing the current beverage based on an identified container filling state.

14. The system of claim 11, wherein the monitoring and control system is additionally configured to:
   control a placement of a beverage container into the dispensing area.

15. A method, comprising:
   capturing an image of a top surface of a beverage being poured;
   determining a state of the beverage being poured according to a classification of pixels representing the top surface;
   controlling an actuator to adjust pouring of the beverage in response to the state of the beverage that was determined according to the classification of pixels representing the top surface; and
   signaling an apparatus to preselect a beverage making program to pour the beverage based on a size or type of an identified beverage container or stopping pouring of the beverage based on an identified container filling state,
   wherein the state of the beverage being poured according to the classification of pixels includes a speed at which foam at the top surface of the beverage is rising by repeatedly identifying the filling state.

16. The method of claim 15, wherein the state of the beverage being poured according to the classification of pixels includes a color of the top surface.

17. The method of claim 16, wherein the state of the beverage being poured includes the state of a drinkable food being poured into the identified beverage container.

* * * * *